United States Patent
Voll et al.

(10) Patent No.: US 7,432,619 B2
(45) Date of Patent: Oct. 7, 2008

(54) DISTANCE EXTENDER

(75) Inventors: Parker J. Voll, Rochester, NY (US);
Randy J. King, Rochester, NY (US);
Jack E. Priebe, Palmyra, NY (US);
Ronald C. Moffatt, Rochester, NY (US)

(73) Assignee: Belkin International, Inc., Compton, CA (US)

( * ) Notice: Subject to any disclaimer, the term of this patent is extended or adjusted under 35 U.S.C. 154(b) by 0 days.

(21) Appl. No.: 11/789,893

(22) Filed: Apr. 25, 2007

(65) Prior Publication Data

US 2007/0284949 A1 Dec. 13, 2007

Related U.S. Application Data

(63) Continuation of application No. 10/670,403, filed on Sep. 24, 2003, now Pat. No. 7,259,482.

(51) Int. Cl.
*H01B 11/02* (2006.01)
*H02B 1/20* (2006.01)

(52) U.S. Cl. ........................................ 307/147

(58) Field of Classification Search .................. 307/147
See application file for complete search history.

(56) References Cited

U.S. PATENT DOCUMENTS

| | | | |
|---|---|---|---|
| 3,634,830 A | 1/1972 | Baskin | |
| 3,774,158 A | 11/1973 | Clark | |
| 3,955,188 A | 5/1976 | Viswanathan | |
| 4,078,249 A | 3/1978 | Lelke et al. | |
| 4,081,797 A | 3/1978 | Olson | |
| 4,150,429 A | 4/1979 | Ying | |
| 4,243,984 A | 1/1981 | Ackley et al. | |
| 4,313,176 A | 1/1982 | Cecil | |

(Continued)

FOREIGN PATENT DOCUMENTS

DE G9303716.3 11/1993

(Continued)

OTHER PUBLICATIONS

Hartcomm.org White Papers: HCF—Technical—White Papers—white_papers.html; 1 page.

(Continued)

*Primary Examiner*—Michael J Sherry
*Assistant Examiner*—Hal I Kaplan
(74) *Attorney, Agent, or Firm*—Bryan Cave LLP

(57) ABSTRACT

A distance extender (100, 200) for increasing a distance between a first device (145) and a second device (150) in electrical communication with the first device includes an electrical cable (130, 230) electrically coupled between the first device and the second device, a first subsystem (110, 210) electrically coupled to the first end of the electrical cable, and a second subsystem (120, 220) electrically coupled to the second end of the electrical cable. The electrical cable includes a first end (131, 231), a second end (132, 232), and a plurality of wires extending between the first end and the second end. The plurality of wires includes a first wire, the first device generates a data signal and provides an electrical power signal, and the data signal and the electrical power signal are simultaneously transmitted between the first device and the second device over the first wire.

17 Claims, 15 Drawing Sheets

U.S. PATENT DOCUMENTS

| | | | |
|---|---|---|---|
| 4,468,612 A | 8/1984 | Starr | |
| 4,479,122 A | 10/1984 | Redman et al. | |
| 4,550,386 A | 10/1985 | Hirosawa et al. | |
| 4,599,611 A | 7/1986 | Bowker et al. | |
| 4,630,284 A | 12/1986 | Cooperman | |
| 4,641,262 A | 2/1987 | Bryan et al. | |
| 4,665,501 A | 5/1987 | Saldin et al. | |
| 4,680,622 A | 7/1987 | Barnes et al. | |
| 4,710,917 A | 12/1987 | Tompkins et al. | |
| 4,730,251 A | 3/1988 | Aakre et al. | |
| 4,768,083 A | 8/1988 | Romesburg | |
| 4,800,429 A | 1/1989 | Perkins | |
| 4,807,184 A | 2/1989 | Shelor | |
| 4,823,256 A | 4/1989 | Bishop et al. | |
| 4,876,712 A | 10/1989 | Brint et al. | |
| 4,879,716 A | 11/1989 | McNalley et al. | |
| 4,907,079 A | 3/1990 | Turner et al. | |
| 4,939,507 A | 7/1990 | Beard et al. | |
| 4,941,087 A | 7/1990 | Kap | |
| 4,949,169 A | 8/1990 | Lumelsky et al. | |
| 4,949,248 A | 8/1990 | Caro | |
| 4,953,027 A | 8/1990 | Tong et al. | |
| 4,953,159 A | 8/1990 | Hayden et al. | |
| 4,972,470 A | 11/1990 | Farago | |
| 5,029,111 A | 7/1991 | Mansell | |
| 5,036,484 A | 7/1991 | McCoy et al. | |
| 5,043,866 A | 8/1991 | Myre, Jr. et al. | |
| 5,051,720 A | 9/1991 | Kittirutsunetorn | |
| 5,117,225 A | 5/1992 | Wang | |
| 5,121,486 A | 6/1992 | Kurihara et al. | |
| 5,128,766 A | 7/1992 | Choi | |
| 5,166,674 A | 11/1992 | Baum et al. | |
| 5,181,858 A | 1/1993 | Matz et al. | |
| 5,214,785 A | 5/1993 | Fairweather | |
| 5,220,380 A | 6/1993 | Hirata et al. | |
| 5,222,212 A | 6/1993 | Johary et al. | |
| 5,226,123 A | 7/1993 | Vockenhuber | |
| 5,230,066 A | 7/1993 | Morimi | |
| 5,247,364 A | 9/1993 | Banker et al. | |
| 5,247,615 A | 9/1993 | Mori et al. | |
| 5,260,778 A | 11/1993 | Kauffman et al. | |
| 5,261,079 A | 11/1993 | Celi, Jr. | |
| 5,268,676 A | 12/1993 | Asprey et al. | |
| 5,280,583 A | 1/1994 | Nakayama et al. | |
| 5,283,639 A | 2/1994 | Esch et al. | |
| 5,287,461 A | 2/1994 | Moore | |
| 5,301,028 A | 4/1994 | Banker et al. | |
| 5,317,391 A | 5/1994 | Banker et al. | |
| 5,317,695 A | 5/1994 | Celi, Jr. | |
| 5,327,156 A | 7/1994 | Masukane et al. | |
| 5,330,370 A | 7/1994 | Reddersen et al. | |
| 5,347,113 A | 9/1994 | Reddersen et al. | |
| 5,347,646 A | 9/1994 | Hirosawa et al. | |
| 5,349,675 A | 9/1994 | Fitzgerald et al. | |
| 5,357,276 A | 10/1994 | Banker et al. | |
| 5,357,420 A | 10/1994 | Gohi | |
| 5,367,571 A | 11/1994 | Bowen et al. | |
| 5,369,593 A | 11/1994 | Papamarcos et al. | |
| 5,381,477 A | 1/1995 | Beyers, II et al. | |
| 5,392,400 A | 2/1995 | Berkowitz et al. | |
| 5,396,593 A | 3/1995 | Mori et al. | |
| 5,440,618 A | 8/1995 | Riegel et al. | |
| 5,440,632 A | 8/1995 | Bacon et al. | |
| 5,448,697 A | 9/1995 | Parks et al. | |
| 5,465,105 A | 11/1995 | Shatas et al. | |
| 5,477,262 A | 12/1995 | Banker et al. | |
| 5,485,221 A | 1/1996 | Banker et al. | |
| 5,486,868 A | 1/1996 | Shyu et al. | |
| 5,486,869 A | 1/1996 | Cooper | |
| 5,489,947 A | 2/1996 | Cooper | |
| 5,499,377 A | 3/1996 | Lee | |
| 5,502,499 A | 3/1996 | Birch et al. | |
| 5,504,522 A | 4/1996 | Setogawa | |
| 5,519,874 A | 5/1996 | Yamagishi et al. | |
| 5,524,362 A | 6/1996 | Quandt et al. | |
| 5,526,024 A | 6/1996 | Gaglianello et al. | |
| 5,534,942 A | 7/1996 | Beyers, Jr. et al. | |
| 5,537,548 A | 7/1996 | Fin et al. | |
| 5,539,822 A | 7/1996 | Lett | |
| 5,542,053 A | 7/1996 | Bland et al. | |
| 5,577,210 A | 11/1996 | Abdous et al. | |
| 5,579,057 A | 11/1996 | Banker et al. | |
| 5,579,087 A | 11/1996 | Salgado | |
| 5,581,303 A | 12/1996 | Djabbari et al. | |
| 5,583,993 A | 12/1996 | Foster et al. | |
| 5,592,551 A | 1/1997 | Lett et al. | |
| 5,603,060 A | 2/1997 | Weinberger et al. | |
| 5,604,509 A | 2/1997 | Moore et al. | |
| 5,606,604 A | 2/1997 | Rosenblatt et al. | |
| 5,608,872 A | 3/1997 | Schwartz et al. | |
| 5,613,096 A | 3/1997 | Danknick | |
| 5,617,547 A | 4/1997 | Feeney et al. | |
| 5,642,153 A | 6/1997 | Chaney et al. | |
| 5,657,414 A | 8/1997 | Lett et al. | |
| 5,664,229 A | 9/1997 | Bhargava et al. | |
| 5,674,003 A | 10/1997 | Andersen et al. | |
| 5,689,671 A | 11/1997 | Strömberg | |
| 5,699,533 A | 12/1997 | Sakai | |
| 5,701,161 A | 12/1997 | Williams et al. | |
| 5,708,961 A | 1/1998 | Hylton et al. | |
| 5,715,515 A | 2/1998 | Akins, III et al. | |
| 5,719,622 A | 2/1998 | Conway | |
| 5,721,842 A | 2/1998 | Beasley et al. | |
| 5,724,525 A | 3/1998 | Beyers, II et al. | |
| 5,724,529 A | 3/1998 | Smith et al. | |
| 5,732,212 A | 3/1998 | Perholtz et al. | |
| 5,734,334 A | 3/1998 | Hsieh et al. | |
| 5,742,677 A | 4/1998 | Pinder et al. | |
| 5,752,032 A | 5/1998 | Keller et al. | |
| 5,758,099 A | 5/1998 | Grieco et al. | |
| 5,761,447 A | 6/1998 | Knox et al. | |
| 5,761,448 A | 6/1998 | Adamson et al. | |
| 5,768,224 A | 6/1998 | Tanaka et al. | |
| 5,768,568 A | 6/1998 | Inui et al. | |
| 5,774,859 A | 6/1998 | Houser et al. | |
| 5,781,748 A | 7/1998 | Santos et al. | |
| 5,784,702 A | 7/1998 | Greenstein et al. | |
| 5,799,171 A | 8/1998 | Kondou | |
| 5,801,789 A | 9/1998 | Zeidler et al. | |
| 5,835,791 A | 11/1998 | Goff et al. | |
| 5,864,708 A | 1/1999 | Croft et al. | |
| 5,884,096 A | 3/1999 | Beasley et al. | |
| 5,935,224 A | 8/1999 | Svancarek et al. | |
| 5,937,176 A | 8/1999 | Beasley et al. | |
| 5,978,389 A | 11/1999 | Chen | |
| 5,983,085 A * | 11/1999 | Zamat et al. | 455/127.1 |
| 6,006,338 A | 12/1999 | Longsdorf et al. | |
| 6,038,616 A | 3/2000 | Thornton et al. | |
| 6,040,817 A | 3/2000 | Sumikawa | |
| 6,044,428 A | 3/2000 | Rayabhari | |
| 6,098,116 A | 8/2000 | Nixon et al. | |
| 6,112,264 A | 8/2000 | Beasley et al. | |
| 6,119,148 A | 9/2000 | Chen | |
| 6,141,719 A | 10/2000 | Rafferty et al. | |
| 6,151,645 A | 11/2000 | Young et al. | |
| 6,154,380 A * | 11/2000 | Assow et al. | 363/61 |
| 6,160,543 A | 12/2000 | Chen | |
| 6,162,078 A | 12/2000 | Chung | |
| 6,215,907 B1 | 4/2001 | Kumar et al. | |
| 6,256,014 B1 | 7/2001 | Thomas et al. | |
| 6,281,457 B1 | 8/2001 | Chang | |
| D449,608 S | 10/2001 | Chang | |
| 6,304,895 B1 | 10/2001 | Schneider et al. | |
| 6,324,605 B1 | 11/2001 | Rafferty et al. | |

| | | | |
|---|---|---|---|
| 6,345,323 | B1 | 2/2002 | Beasley et al. |
| 6,378,009 | B1 | 4/2002 | Pinkston, II et al. |
| 6,378,014 | B1 | 4/2002 | Shirley |
| 6,388,658 | B1 | 5/2002 | Ahern et al. |
| 6,539,418 | B2 * | 3/2003 | Schneider et al. ........... 709/203 |
| 6,615,090 | B1 | 9/2003 | Blevins et al. |
| 6,633,905 | B1 | 10/2003 | Anderson et al. |
| 6,671,756 | B1 | 12/2003 | Thomas et al. |
| 6,672,896 | B1 | 1/2004 | Li |
| 6,989,735 | B2 | 1/2006 | Fisher et al. |
| 6,995,658 | B2 | 2/2006 | Tustison et al. |
| 6,998,963 | B2 * | 2/2006 | Flen et al. ................... 375/260 |
| 7,015,397 | B2 | 3/2006 | Clark |
| 2001/0032275 | A1 | 10/2001 | Watanabe et al. |
| 2001/0053711 | A1 | 12/2001 | Chou |
| 2002/0004912 | A1 | 1/2002 | Fung |
| 2002/0027496 | A1 | 3/2002 | Cern et al. |
| 2002/0038334 | A1 | 3/2002 | Schneider, et al. |
| 2002/0054029 | A1 | 5/2002 | Glancy et al. |
| 2002/0072892 | A1 | 6/2002 | Shirley |
| 2002/0091850 | A1 | 7/2002 | Perholtz, et al. |
| 2002/0097220 | A1 | 7/2002 | Ferguson, et al. |
| 2002/0116539 | A1 | 8/2002 | Bryczkowski, et al. |
| 2002/0124128 | A1 | 9/2002 | Qiu |
| 2002/0143996 | A1 | 10/2002 | Odryna, et al. |
| 2002/0193015 | A1 | 12/2002 | Milan |
| 2002/0198934 | A1 | 12/2002 | Kistler, et al. |
| 2003/0005186 | A1 | 1/2003 | Gough |
| 2003/0035049 | A1 | 2/2003 | Dickens, et al. |
| 2003/0037130 | A1 | 2/2003 | Rollins |
| 2003/0051021 | A1 | 3/2003 | Hirschfeld, et al. |
| 2003/0131127 | A1 * | 7/2003 | King et al. .................. 709/238 |
| 2003/0135654 | A1 | 7/2003 | Chang |
| 2004/0225804 | A1 | 11/2004 | Leete |
| 2004/0232768 | A1 | 11/2004 | Hung et al. |
| 2005/0017849 | A1 | 1/2005 | Flen et al. |
| 2005/0055586 | A1 | 3/2005 | Flen et al. |
| 2005/0185349 | A1 * | 8/2005 | Biester et al. ................. 361/18 |

FOREIGN PATENT DOCUMENTS

| | | |
|---|---|---|
| EP | 0 174 099 A2 | 3/1986 |
| EP | 0962663 A2 | 5/1999 |
| EP | 0982663 A2 | 8/1999 |
| GB | 2394124 A | 4/2004 |
| JP | 10-187303 | 7/1998 |
| WO | WO 87/00317 | 1/1987 |
| WO | WO 94/19749 | 9/1994 |
| WO | WO 95/01055 | 1/1995 |
| WO | WO 96/023857 | 8/1996 |
| WO | WO 98/12641 | 3/1998 |

OTHER PUBLICATIONS

Helson, Ron; *The Impact of HART on Process Automation, The Compelling Case for the World's Most Used Digital Communications Protocol*; Jun. 1, 2004; 3 pages.

Helson, Ron; *HART Communication: Driving New Product Developments*; Mar. 1, 2004; 11 pages.

*The Hart® Protocol—A Solution Enabling Technology*; Feb. 1, 2004; 5 pages.

*Time to Tap Into HART, Seize the Data. There Are Major Asset Management and Process Improvement Gains to Be Realized With HART*; Nov. 1, 2003; 3 pages.

Helson, Ron; *Preventing Process Disruptions, The Solution Could Be in Your Smart Instruments*; Aug. 1, 2002; 4 pages.

Pratt, Wally; *HART Networks*; Apr. 1, 2002; 32 pages.

Pratt, Wally; *Evaluating Fieldbus Networks: Choose the Right Tool for the Job, i.e. Sorting Out The Protocols: Nework Soup*; Jan. 1, 2002; 17 pages.

*Be As Smart As Your Instruments, Getting More from HART Communications*; Apr. 1, 2001; 1 page.

Helson, Ron; *Understanding the Power of HART Communication*; Mar. 1, 2003; 3 pages.

Adler, Bud; *Continuous HART Communication Increases Safety Integrity Level (SIL)*; Dec. 1, 2000; 3 pages.

*List of Articles Regarding Hart Communications*; HCF—Newsmain—articles.html; 2 pages.

*Preventing Process Disruptions, The Solution Could Be in Your Smart Instruments*2002; HCF—Newsmain—Articles—2002—Preventing Process Disr Article—prevprocdis.html; 3 pages.

*Detroit Water & Sewerage Department Wins Award*; Dec. 2003; Valve World Magazine; HCF—Newsmain—Articles—2003—valve world—valve_world.html; 3 pages.

Helson, Ron; *You've Got the Power*; 2002; Power of HART Control Magazine Supplement; HCF—Newsmain—Articles—2002—Control Suppl 2002—controlmain1102.html; 1 page.

*Leverage Your Assets*; 2002; Power of HART Control Magazine Supplement; HCF—Newsmain—Articles—2002—Control Suppl 2002—firstarticle1102.html; 4 pages.

*Unleash the Power of HART*; 2002; Power of HART Control Magazine Supplement; HCF—Newsmain—Articles—2002—Control Suppl 2002—secondarticle.html; 2 pages.

*Powerful Connections*; 2002; Power of HART Control Magazine Supplement; HCF—Newsmain—Articles—2002—Control Suppl—thirdarticle.html; 2 pages.

*HART Plant of the Year*; 2002; Power of HART Control Magazine Supplement; HCF—Newsmain—Articles—2002—Control Suppl 2002—splantoftheyear1102.html; 2 pages.

*Contents*; 2001; Power of HART Control Magazine; HCF—Newsmain—Articles—2001—Control Suppl—control2001.html; 2 pages.

*Get Started*; 2001; Power of HART Control Magazine Supplement; 2 pages.

*Put it to Work*; 2001; Power of HART Control Magazine Supplement; 6 pages.

*Hidden in HART*; 2001; Power of HART Control Magazine Supplement; 5 pages.

Helson, Ron; *Get Connected*; 2003; Control Magazine Supplement; HCF—Newsmain—Articles—2003—Control 2003—controlmain1103.html; 1 page.

*Platform for the Future*; 2003; Control Magazine Supplement; HCF—Newsmain—Articles—2003—Control Suppl—Platform—platform.html; 3 pages.

*HART Capabilities Provide Fundamental Value*; 2003; Control Magazine Supplement; 2 pages.

*Time to Tap into HART*; 2003; Control Magazine Supplement; HCF—Newsmain—Articles—2003—Control Suppl—Time to tap—time_to_tap.html; 2 pages.

*HART Plant of the Year*; 2003; Control Magazine Supplement; HCF—Newsmain—Articles—2003—Control Suppl—Plant of the Year—Plant_of_the_year.html; 3 pages.

Helson, Ron; *Use the Power of HART*; 2001; Power of HART Control Magazine Supplement; 1 page.

*Call for Information*; 2001; Power of HART Control Magazine Supplement; 4 pages.

European Search Report: dated Jul. 14, 2006; 3 pages.

Sharp: Recording MD Player Due I Early "94", HFD *the Weekly Home furnishings Newspaper*, Jun. 1993; 2 pages.

"Panasonic's New Video Line Offers More Styling, User-Friendly Features", HFD *The Weekly Home Furnishings Ne wspaper*, Jul. 1992. (copy not available).

Nguyen, Huy, "Key-view unlocks server problems", PC Week, Mar. 27, 1995,v12,pN20; 6 pages.

"Promoting Camcorder", Camcorder mfrs & retailers try creative promotions to reduce heavy inventories, Jul. 20, 1992; 2 pages.

Article: Belkin Launches New Generation of OmniCube™ SVM Switches Oct. 25, 2001; 1 page.

Article: Network Technologies "White Paper KVM Switch Solutions" Mar. 1, 2001; 38 pages.

APEX PC Solutions Product Brochure, APEX PC Solutions, Redmond, Washington; 1 page.

NTI Catalog, 2001; 52 pages.

Belkin OmniView Catalog, 1999; 16 pages.

NTI. Description of Video Switch, Monitor Switch product [online], [retrieved on Dec. 26, 2001], Retrieved from the Internet. <URL://http://www.networktechinc.com/vidswt.html>; 7 pages.

APEX Desktop Concentrator Product Brochure, APEX PC Solutions, Redmond, Washington—date prior to Aug. 1997; 2 pages.

NTI Product Information Sheet—no date (Copy not available).

APEX PC Solutions Users Guide, Manual P/N 053-0006-01, 8001/KVM, Redmond, Washington—Apr. 1993; 15 pages.

KVM. Description of KVM Switch product [online], [retrieved on Dec. 26, 2001], Retrieved from the Internet. URL://http://www.kvm-switches-online.com/index.html; 2 pages.

Belkin. Description of KVM OmniView product [online], [retrieved on Oct. 30, 2001], Retrieved from the Internet. URL://http://www.belkin.com/moreabout/kvm.html; 8 pages.

"Electron Components: On Screen Display Ics", NEC Corporation, Apr. 1994 (copy not available).

"10comm ThinkSync II CM-2131T: Eye-Pleasing Trinitron CRT", *Windows Sources: The Magazine for Windows Experts*, vol. 1, No. 3, pp. 240-241, 244, Apr. 1993; 5 pages.

"Genlocking" Tech Note, S3 Incorporated, Sep. 1993 (copy not available).

News Release "Maxi Switch, Inc. Introduces Industry's First Software Utility Permitting On-Screen Display of User-Progaied Keyboard Settings", Tucson, Arizona, Nov. 23, 1992; 2 pages.

PR Newswire, "Sony Makes Bold Decision Statement with the Launch of the Trinitron XBR2 Line of Computer Televisions", New York, Oct. 16, 1992; 3 pages.

"Panasonic's New Video Line Offers More Styling, User-Friendly Features", *HFD The Weekly Home Furnishings Newspaper*, Jul. 1992. (Copy not available).

Reachout: Remote Control for Windows and DOS, Uer Guide Version 2.1, Ocean Isle Software, Revised Jul. 2, 1992. (Copy not available).

"Lotus Brand Portable, Home TVs Bow", HFD The Weekly Home Furnishings Newspaper, vol. 64, No. 28, pp. 106 and 123, Jul. 9, 1990; 2 pages.

Gosch, J., "Solid-State Captions", *Electronics*, pp. 36-37, Apr. 1990. (Copy not available).

Levine, J.A., "TV Makers Focus on Upscale Models", *HFD The Weekly Home Furnishings Newspaper*, Date Unknown. (Copy not available).

DeKerf, T and Davis, Gary, D., "The keyboard/Video Switch White Paper: A Close Look at Modern Keyboard/Video Switching", Tron International Inc. and the Work-Center Corporation, 1995; 17 pages.

Switchback™ User Guide, Apex PC Solutions, Mar. 1995; 9 pages.

"Sharp: Recording MD Player Due in Early 94", *HFD the Weekly Home Furnishings Newspaper*, Jun. 7, 1993; 2 pages.

"Goldstar Unveils 5 Upgrade . . . ", *HFD the Weekly Home Furnishings Newspaper*, vo. 68, No. 10, Mar. 7, 1994; 1 page.

"MS Left Breathless by Jaunt through Eugene, OR, Video Countryside", *Consumer Electronics*, vol. 16, No. 4, Jun. 1988; 4 pages.

"Networking Software Master Net", Rose Electronics, 1988©. (Copy not available).

CES '87 Consumer Electronics Show: New Products, Jan. 5, 1987; 7 pages.

"Panasonic VHS VCR Series Features Rounded Contours", HFD The Weekly Home Furnishings Newspaper, pp. 71 and 84, Jan. 5, 1987; 2 pages.

Master Link: Communication Utility for the PC, Rose Electronics, 1987©. (Copy not available).

PR Newswire, "RCA Announces First Video Disc Player with Programmable Capability", Indianapolis, Aug. 12, 1983; 2 pages.

Buchsbaum, W., "RCA Model VGM 2023s 25" Color TV Receiver, Computers & Electronics, pp. 104, 106, 107, 109, Feb. 1983; 4 pages.

8001/ KVM Users Guide, Apex PC Solutions, Date Unknown. (Copy not available).

Addendum I to User's Manual for MasterNet Version 2.00, Rose Electronics, Revision A. Date Unknown. (Copy not available).

Carrell, J.L. and Boyle, P.R., "ONline System Concentrator", *PC Magazine*, Nov. 10, 1992; 3 pages.

MasterNet Networking Software Product Bulletin, "Zero Slot Lan Software Users Sharing Device" and Instant Control of Your Peripherals. Rose Electronics. Date unknown (copy not available).

Apex PC Solutions, "Apex/Desktop Concentrator" advertisement. Date unknown. (Copy not available).

Apex PC Solutions advertisement. Date unknown. (Copy not available).

Motorola Semiconductor Technical Data, "Advanced Monitor On-Screen Display CMOS", Rev. 2, Feb. 1997.; 14 pages.

General Instrument 2750R Satellite Receiver User's Guide 2700 Series, Publication No. 72089-1, Rev. C, Apr. 1990; 71 pages.

Rigney, Steve, "J&L's server room in a box", *PC Magazine*, May 30, 1995, v. 14, No. 10, p.NE19; 2 pages.

PCT International Search Report for PCT/US96/13772, International Filing Date Aug. 22, 1996. (Copy not available).

* cited by examiner

1500

Provide a first subsystem to be coupled to a first end of a cable extending between a computer and an operator control center, the cable having a first wire pair and a second wire pair — 1510

Provide a second subsystem to be coupled to a second end of the cable such that an electrical power signal provided by a computer and a data signal generated by the computer or an operator control center are transmitted simultaneously across the first wire pair between the computer and the operator control center — 1520

Modulate the data signal to create a modulated data signal — 1530

Modify the electrical power signal to create a boosted electrical voltage signal — 1540

Couple the modulated data signal onto the boosted electrical voltage signal to create a combined signal — 1550

Transmit the combined signal across the first wire pair between the computer and the operator control center — 1560

FIG.15

DISTANCE EXTENDER

CROSS REFERENCE TO RELATED APPLICATIONS

This application is a continuation application of U.S. patent application Ser. No. 10/670,403, filed Sep. 24, 2003 now U.S. Pat. No. 7,259,482.

FIELD OF THE INVENTION

This invention relates generally to electrical signal transmission in electronic systems, and relates more particularly to keyboard, video, and mouse extenders.

BACKGROUND OF THE INVENTION

Electronic systems, such as computer systems, rely for proper operation on the transmission of electronic signals among the various components of the system. In a computer system, for example, electronic signals must be transmitted from the computer to a keyboard, a video monitor, a mouse, and any other peripheral electronic devices coupled to the computer. The acronym KVM will be used herein to mean "keyboard, video monitor, and mouse," following a practice that is standard in the art. Additionally, the phrase "peripheral device" will be used herein to mean any electronic device coupled to a computer or forming a part of any electronic system, including a keyboard, a video monitor, and a mouse.

Under certain circumstances it may be desirable to place the computer in one location and to place the peripheral devices in another location separated from the computer's location by a certain distance. An example of such a circumstance is where the computer must be in an environment, perhaps a particular room in a building, where parameters such as access, temperature, humidity, and the like are carefully controlled but where the peripheral devices may be located in an environment, perhaps another room in the building, where control over such parameters is less critical. Another example of such a circumstance is where a single keyboard, video monitor, and mouse, referred to collectively herein as an "operator control center" or an "OCC," are adapted to control several computers, where the several computers may be located at a distance from the operator control center.

KVM extenders have been developed in order to increase the distance by which an operator control center can be separated from a computer. Existing KVM extenders include a local subsystem, a remote subsystem, and a cable coupled between the local and remote subsystems. The local subsystem is coupled to a computer and/or, if applicable, to a KVM Switch that switches control from one to another of several computers being controlled by an operator control center. The remote subsystem is coupled to the OCC. Electronic signals may be transmitted between the computer and the OCC across the cable via the local and remote subsystems.

Both the local and remote subsystems of existing KVM extenders require the use of power supplies, alternating current (AC) adapters, or the like to provide power to the subsystems. Such power supplies, AC adapters, and the like are bulky and take up a significant amount of space. In many environments, such as in a server rack or in an environmentally controlled room, space is at a premium, and the presence of a power supply or an AC adapter is an inefficient use of that space. Accordingly, there exists a need for a KVM extender providing all of the functionality of existing KVM extenders but that does not require a separate power supply or AC adapter.

BRIEF DESCRIPTION OF THE DRAWINGS

The invention will be better understood from a reading of the following detailed description, taken in conjunction with the accompanying figures in the drawings in which:

FIG. 15 is a flow chart illustrating a method for increasing a distance between a computer and an operator control center in electrical communication with the computer.

Figure 1:
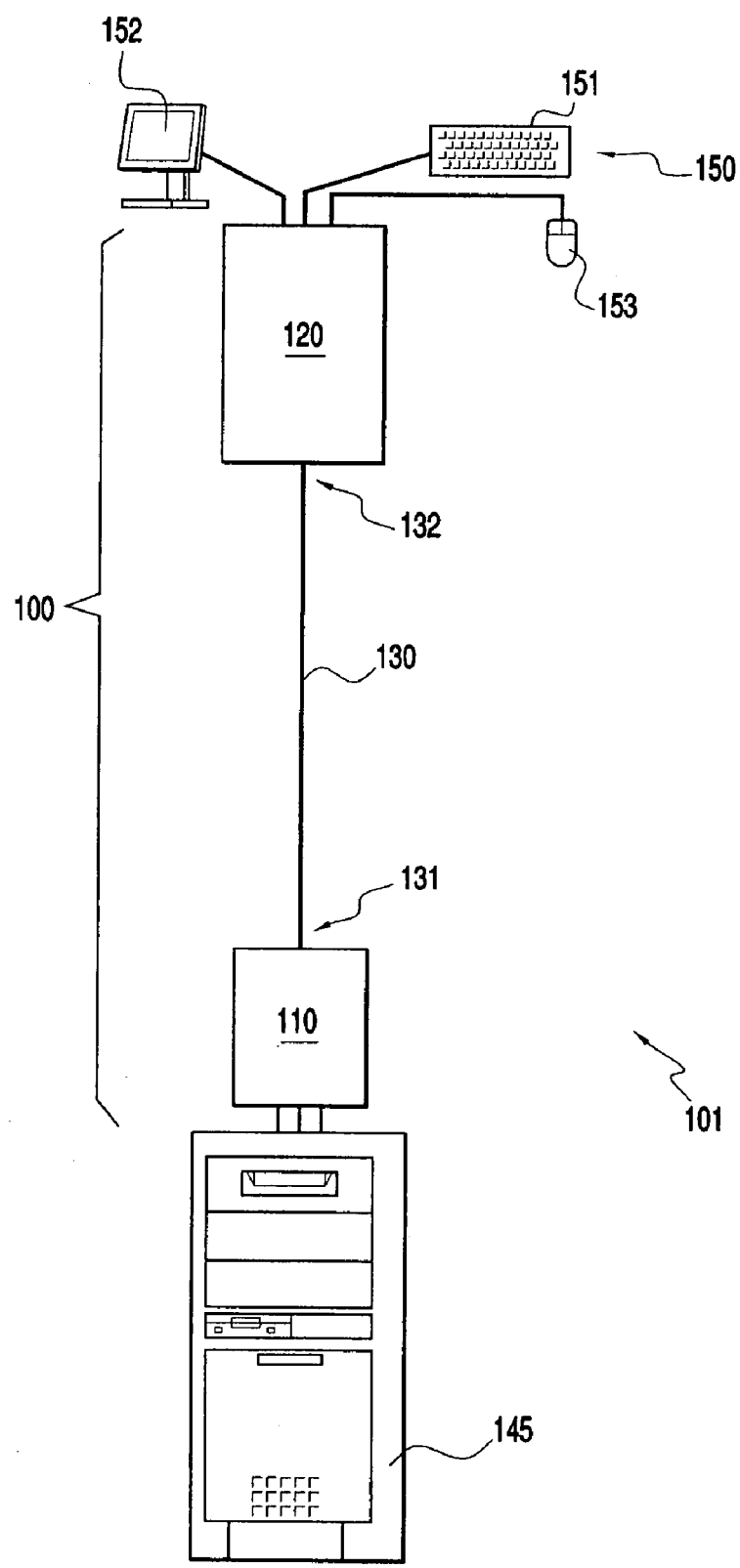
FIG. 1 is a block diagram of a distance extender, according to an embodiment of the invention, shown as part of an electronic system.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical, mechanical, or other manner.

DETAILED DESCRIPTION OF THE DRAWINGS

In one embodiment of the invention, a distance extender for increasing a distance between a first device and a second device in electrical communication with the first device comprises an electrical cable electrically coupled between the first device and the second device, a first subsystem electrically coupled to the first end of the electrical cable, and a second subsystem electrically coupled to the second end of the electrical cable. The electrical cable comprises a first end, a second end, and a plurality of wires extending between the first end and the second end. The plurality of wires includes a first wire, the first device generates a data signal and provides an electrical power signal, and the data signal and the electrical power signal are simultaneously transmitted between the first device and the second device over the first wire.

FIG. 1 is a block diagram of a distance extender 100, according to an embodiment of the invention, shown as part of an electronic system 101. As illustrated in FIG. 1, distance extender 100 comprises a subsystem 110, a subsystem 120, and an electrical cable 130 electrically coupled between subsystems 110 and 120.

As an example, distance extender 100 can be used to increase a distance between a device 145 and a device 150, where device 150 is in electrical communication with device 145. Subsystem 110 and/or subsystem 120 can comprise a stand-alone box, module, or the like, or subsystem 110 and/or subsystem 120 can comprise firmware implemented within a portion of device 145, device 150, and/or another component of distance extender 100. Electrical cable 130 has an end 131 and an end 132 opposite end 131. Subsystem 110 is electrically coupled to end 131 of electrical cable 130, and subsystem 120 is electrically coupled to end 132 of electrical cable 130. Electrical cable 130 further comprises a plurality of wires, including a first wire, extending between end 131 and end 132.

As will be understood by one having ordinary skill in the art, electrical cable 130 further comprises at least a ground return wire. In at least one embodiment, the first wire is one of a pair of wires, collectively referred to as a first wire pair, and the data signal and the electrical power signal are simultaneously transmitted between device 145 and device 150 over the first wire pair, in the sense that the electrical power signal and either the positive or negative portion of a differential data signal can be transmitted on the first wire, while the other wire in the first wire pair carries the ground return signal as well as the portion of the differential data signal not sent on the first wire.

It will be understood by one of ordinary skill in the art that the data signal is bi-directional, meaning it travels along electrical cable 130 both from device 145 to device 150 as well as from device 150 to device 145. In an embodiment where device 150 is an OCC and device 145 is a computer, the data signal will most often be generated by device 150 and then travel across electrical cable 130 to device 145.

Because the electrical power signal is transmitted, as described, across the first wire pair of electrical cable 130, the separate AC adapters or external power supplies required by existing KVM extenders, as well as the circuitry required to support the AC adapters or external power supplies, are not needed in distance extender 100, and are therefore absent from distance extender 100. For a variety of reasons, the absence of AC adapters and external power supplies can be a significant advantage. As an example, AC adapters typically take up as much as two or three cubic inches. The outlets or power strips to which the AC adapters must be coupled also require relatively large amounts of space. Especially in an environment where multiple KVM extenders are present, such as in a server rack or server room, the space required by the AC adapters and the outlets or power strips can often exceed the space available. Another advantage of the absence of AC adapters and external power supplies is that any concern as to whether an AC adapter will fall out of a wall outlet, power strip, or other electrical outlet may be eliminated. Yet another advantage is that there is no need to take time to physically plug such AC adapters in to an electrical outlet.

In a particular embodiment, electrical cable 130 comprises a plurality of unshielded, twisted wire pairs, one of which is the first wire pair described above. As an example, electrical cable 130 can be a Category 5 (CAT 5) cable, a Category 5e (CAT 5e) cable, a Category 6 (CAT 6) cable, a Category 7 (CAT 7) cable, or the like, collectively referred to herein as Category 5-type cable, each of which comprise four unshielded, twisted wire pairs. CAT 5 cable is a relatively inexpensive cable that is well suited for electrical signal transmission. The other existing cable types referred to above were developed to extend the bandwidth and function of the original CAT 5 specification. In at least one embodiment where electrical cable 130 is a CAT 5 cable, the data signal and the electrical power signal are simultaneously transmitted across the first wire pair, and red, green, and blue color analog signals are transmitted across the other three wire pairs.

As further illustrated in FIG. 1, electrical cable 130 is electrically coupled between device 145 and device 150. Device 145 and/or device 150 generate data signal, and device 145 generates an electrical power signal, and the bi-directional data signal and the electrical power signal are simultaneously transmitted between device 145 and device 150 over the first wire. As an example, the data signal can comprise at least one of mouse data and keyboard data. As another example, device 145 can be a computer, and device 150 can be an OCC comprising a keyboard 151, a video monitor 152, and a mouse 153.

In at least one embodiment, subsystem 110, subsystem 120, keyboard 151, and mouse 153 are powered only by the electrical power signal. As an example, in an embodiment where device 145 is a computer, the electrical power signal can be taken from the positive (+) 5 volt (V) supply pins on the computer ports, such as the PS/2 ports, to which a keyboard or a mouse are normally connected. The simultaneous transmission of the electrical power signal and the data signal between device 145 and device 150 across the first wire pair will be discussed in more detail below. It will be understood by one of ordinary skill in the art that at least a portion of device 150, such as, for example, video monitor 152, may require its own power supply when used in connection with distance extender 100, but any portion so requiring its own power supply is one that would also require its own power when used apart from distance extender 100.

Figure 2:
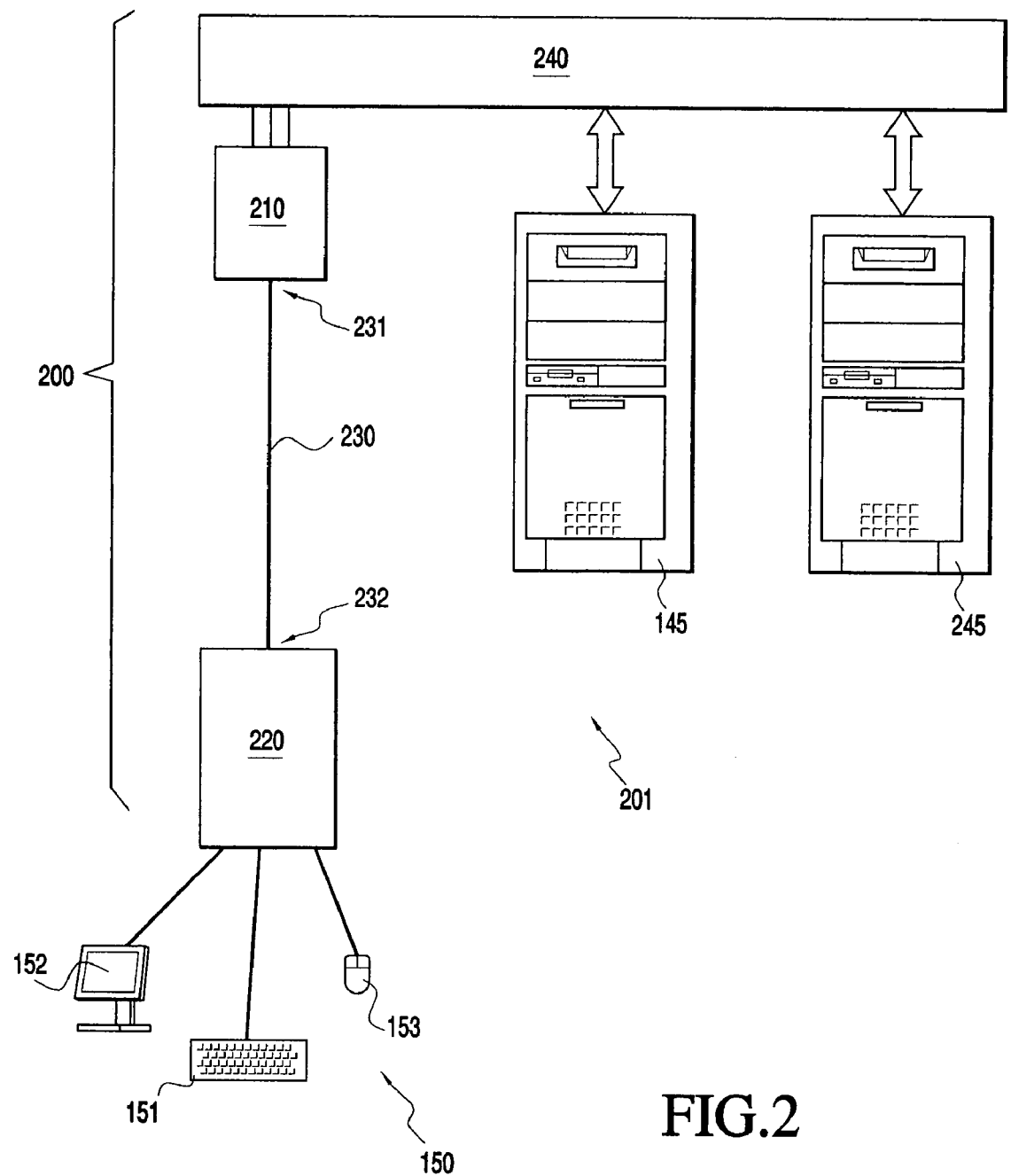
FIG. 2 is a block diagram of a distance extender, according to another embodiment of the invention, shown as part of a different electronic system arranged in a first configuration.

FIG. 2 is a block diagram of a distance extender 200, according to an embodiment of the invention, shown as part of an electronic system 201 arranged in a first configuration. As illustrated in FIG. 2, distance extender 200 comprises a subsystem 210, a subsystem 220, and an electrical cable 230 electrically coupled between subsystems 210 and 220. As an example, subsystem 210, subsystem 220, and electrical cable 230 can be similar to subsystem 110, subsystem 120, and electrical cable 130 respectively, each of which were first shown in FIG. 1. Electrical cable 230 can comprises a plurality of wires, including a first wire, extending between end 231 and end 232. Distance extender 200 further comprises a switch 240 electrically coupled between device 150 and device 145 as well as a device 245. As an example, device 245 can be similar to device 145, first shown in FIG. 1. Additional devices, all of which can also be similar to device 145, can also form a part of electronic system 201, and can also be electrically coupled to switch 240, depending on the configuration and capacity of switch 240. As an example, switch 240 can be a KVM Switch. As another example, distance extender 200 can function in a manner similar to the function of distance extender 100 (FIG. 1).

Switch 240 can be used to selectively route electrical signals to device 150 from one of devices 145, 245, or other device electrically coupled to switch 240, thus enabling any of devices 145, 245, or other device electrically coupled to switch 240 to be controlled from device 150. As an example, in an embodiment where switch 240 is a KVM Switch, device 150 is an OCC, and devices 145 and 245 are computers, switch 240 routes video signals of the selected computer to the video monitor 152 of the OCC so that a user may view the video signals of the selected computer from the OCC. Switch 240 also routes keyboard and mouse signals from the OCC to the respective ports of the selected computer. By using switch 240 in this fashion, the selected computer can be operated from the OCC just as if the OCC's keyboard and mouse were directly attached to the selected computer.

The need to extend a distance separating various components of electronic systems has been mentioned above. FIG. 1 illustrated the use of distance extender 100 to extend a distance separating device 145 from device 150, and, accordingly, subsystem 110 is electrically coupled to device 145 and subsystem 120 is electrically coupled to device 150. In an embodiment where device 145 is a computer and device 150 is an OCC, increasing a distance by which devices 145 and 150 are separated allows a situation in which the computer (device 145) can be located in a room where the environment is carefully controlled while the OCC (device 150) can be located in another room that can be made more comfortable for the user of the OCC. FIG. 2 illustrates a slightly different configuration in which distance extender 200 is used to increase a distance separating device 150 from switch 240, wherein subsystem 210 is electrically coupled to switch 240 and subsystem 220 is electrically coupled to device 150. Such a configuration permits switch 240 and device 150 to be located, for example, in different rooms, yielding a result similar to that described in connection with FIG. 1. Additional configurations are also possible, and desirable, as illustrated below.

Figure 3:
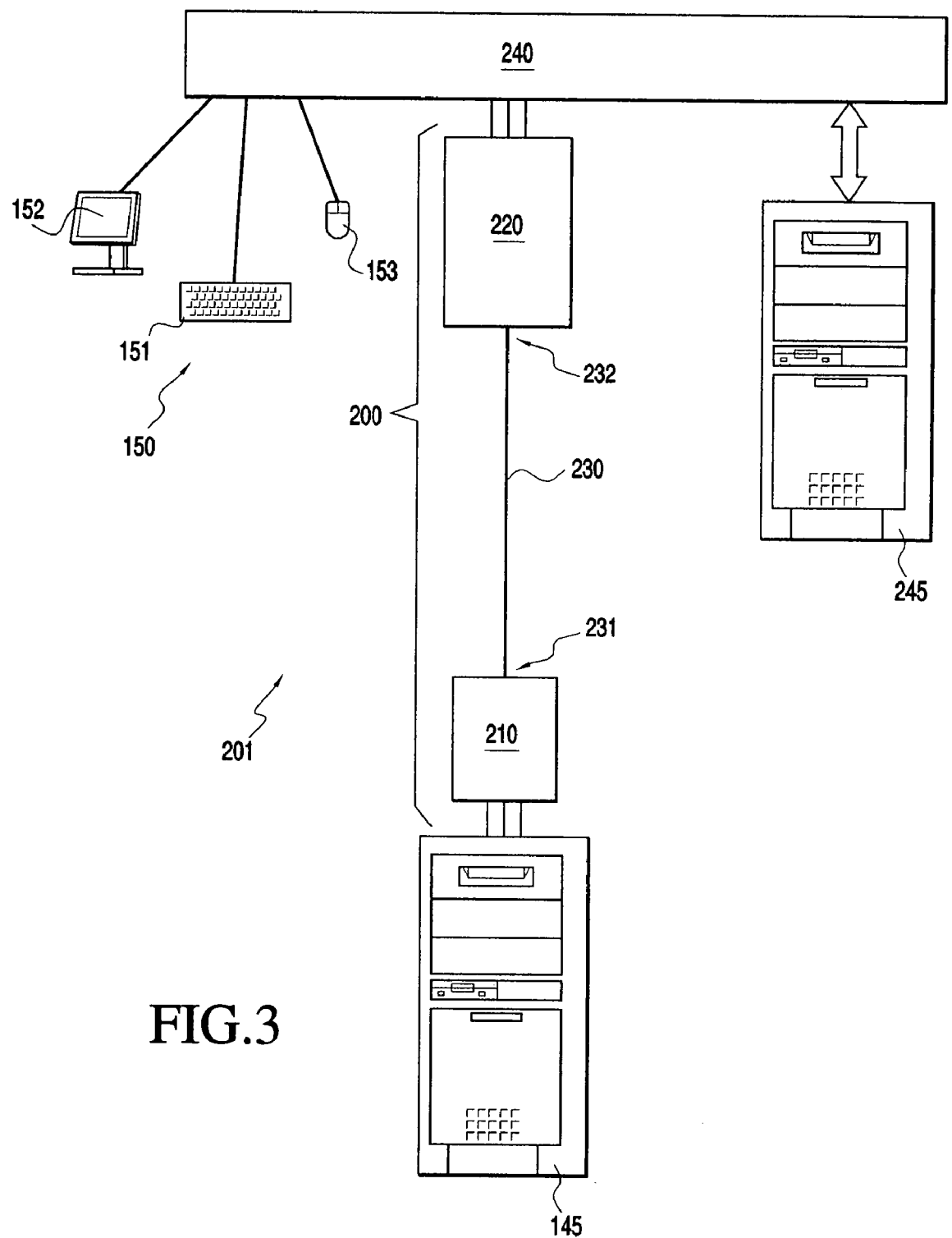
FIG. 3 is a block diagram of the distance extender of FIG. 2 shown as part of the electronic system of FIG. 2 arranged in a second configuration.

FIG. 3 is a block diagram of distance extender 200 shown as part of electronic system 201 arranged in a second configuration. FIG. 3 illustrates one of the possible additional configurations mentioned above, in which distance extender 200 is used to increase a distance separating device 145 from switch 240. In the configuration of FIG. 3, subsystem 210 is electrically coupled to device 145, and subsystem 220 is electrically coupled to switch 240. Such a configuration permits switch 240 and device 150 to be located, for example, in different rooms. In an embodiment where device 145 is a computer, such a configuration may be desirable where the available space within, or the environment of, the room or other location in which switch 240 is located is not sufficient or suitable for the computer (device 145), or vice versa. In one embodiment, not illustrated in FIG. 3, a distance by which device 245 is separated from switch 240 can also be extended, using a second distance extender, where the second distance extender is the same or substantially similar to distance extender 200.

Figure 4:
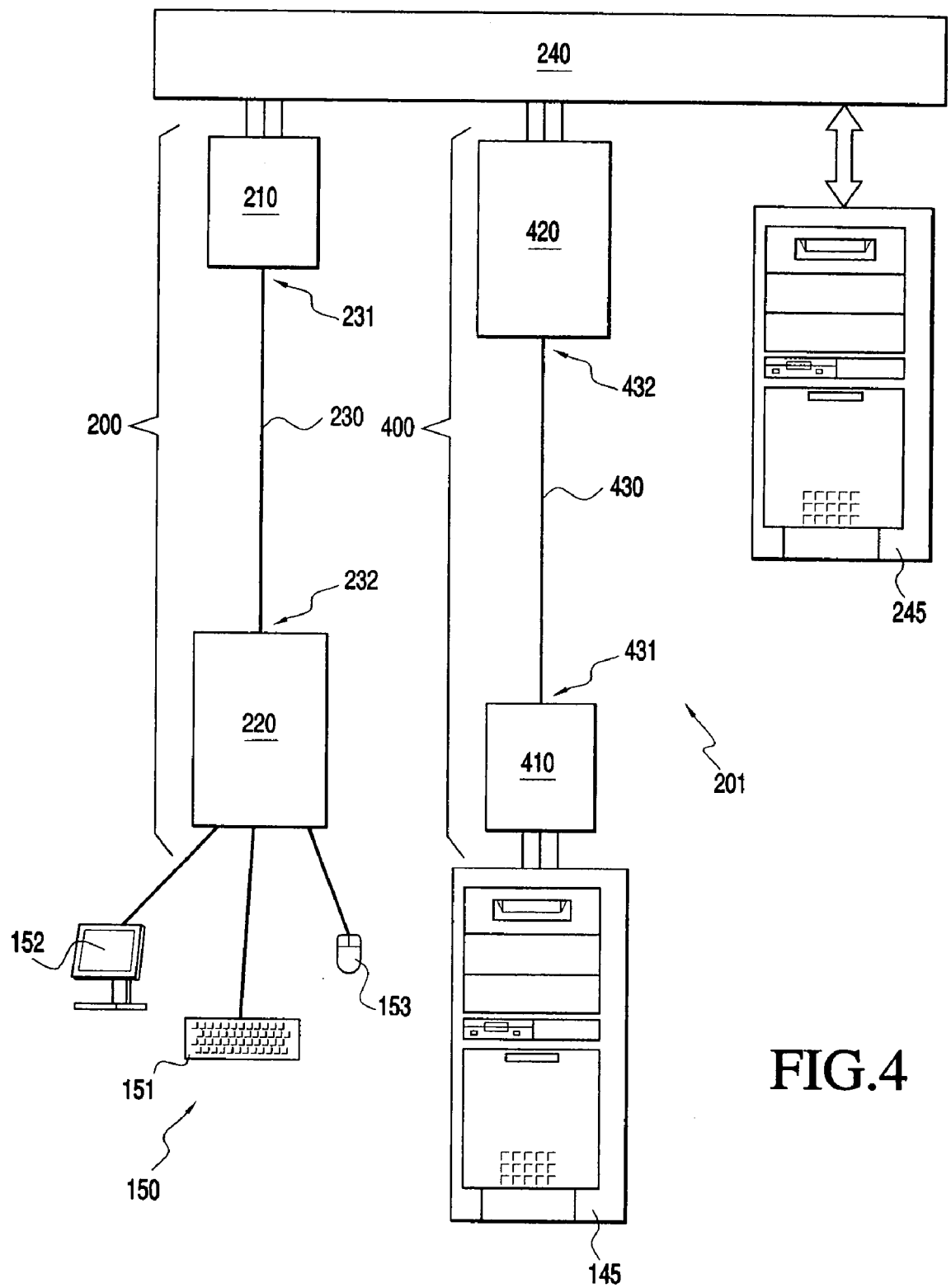
FIG. 4 is a block diagram of the distance extender of FIG. 2 shown as part of the electronic system of FIG. 2 arranged in a third configuration.

FIG. 4 is a block diagram of distance extender 200 shown as part of electronic system 201 arranged in a third configuration. FIG. 4 illustrates another one of the possible additional configurations mentioned above, in which distance extenders according to embodiments of the invention are used to increase both a distance separating device 145 from switch 240 and a distance separating device 150 from switch 240. As illustrated in FIG. 4, distance extender 200 is used to extend a distance separating device 150 from switch 240, such that subsystem 210 is electrically coupled to switch 240, and subsystem 220 is electrically coupled to device 150. A distance extender 400 is used to extend a distance separating device 145 from switch 240. Electrical cable 430 can comprises a plurality of wires, including a first wire, extending between end 431 and end 432. Distance extender 400 comprises a subsystem 410, a subsystem 420, and an electrical cable 430. As an example, subsystem 410, subsystem 420, and electrical cable 430 can be similar to subsystem 110, subsystem 120, and electrical cable 130, respectively, each of which were first shown in FIG. 1. Subsystem 410 is electrically coupled to device 145, and subsystem 420 is electrically coupled to switch 240.

The configuration of FIG. 4 permits switch 240, device 145, and device 150 to each be located, for example, in different rooms. In an embodiment where device 145 is a computer and device 150 is an OCC, such a configuration may be desirable where the available space within, or the environment of, the room or other location in which switch 240 is located is not sufficient or suitable for the computer (device 145), and/or for the OCC (device 150), or vice versa. In one embodiment, not illustrated in FIG. 4, a distance by which device 245 is separated from switch 240 can also be extended, using an additional distance extender, where the additional distance extender is the same or substantially similar to distance extender 200.

Figure 5:
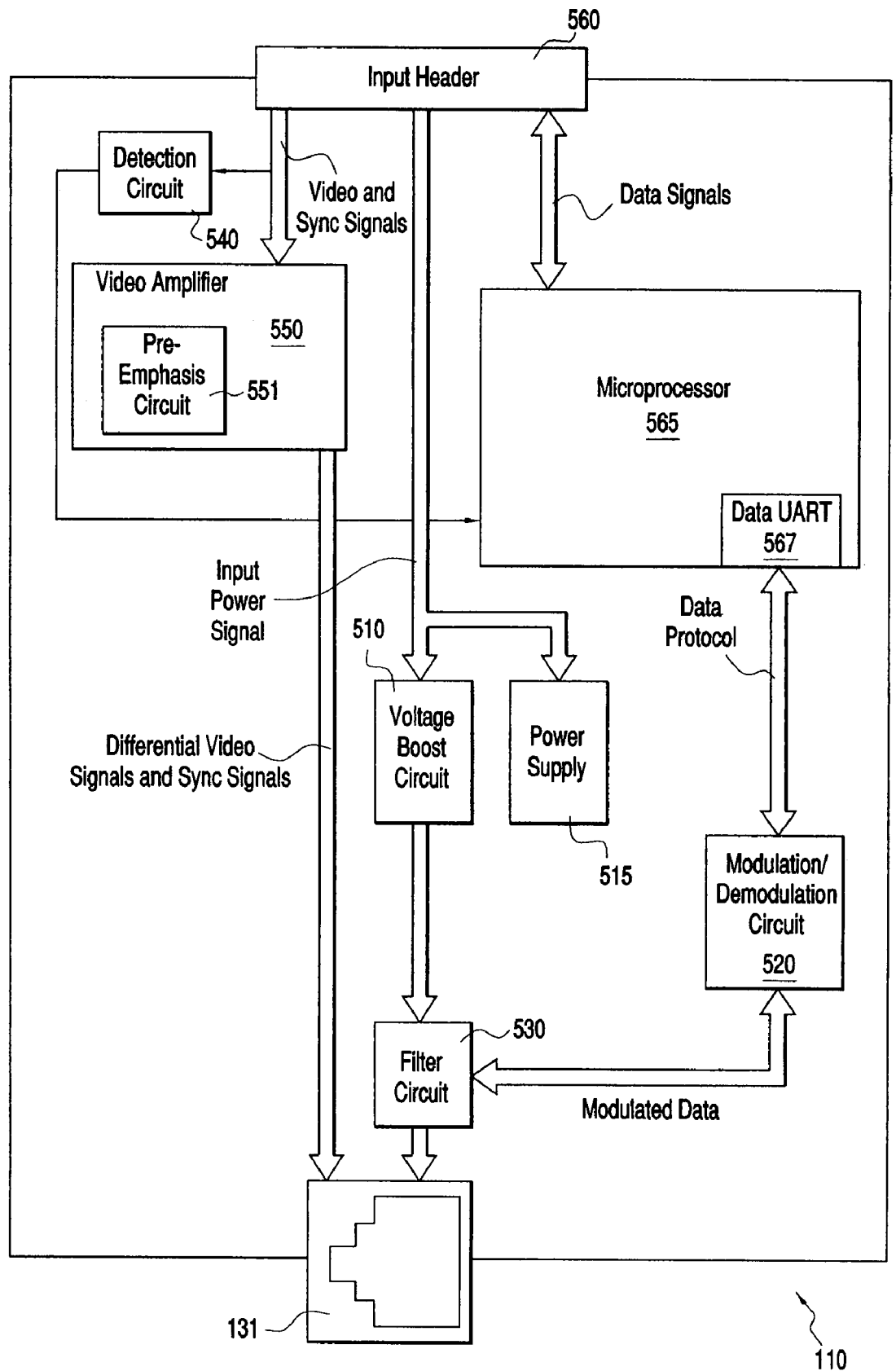
FIG. 5 is a block diagram of a subsystem of the distance extenders of FIGS. 1 and 2, according to an embodiment of the invention.

FIG. 5 is a block diagram of subsystem 110 of distance extender 100 (FIG. 1), according to an embodiment of the invention. As stated above, in at least one embodiment, subsystem 210 of distance extender 200, both of which were first shown in FIG. 2, and subsystem 410 of distance extender 400, both of which were first shown in FIG. 4, can be the same or substantially similar to subsystem 110. As illustrated in FIG. 5, subsystem 110 comprises a voltage boost circuit 510, a modulation/demodulation circuit 520, a filter circuit 530, a detection circuit 540, and a pre-emphasis circuit 551. Circuits 520, 530, 540, and 551 will each be described in more detail below.

The following description assumes an embodiment where device 150 is a computer. Subsystem 110 receives the data signal and a clock signal through an input header 560. The data and clock signals are routed directly to a microprocessor 565 where they are multiplexed and coded before being transmitted to modulation/demodulation circuit 520 via an internal Universal Asynchronous Receiver Transmitter (UART) 567.

Power for the circuitry of subsystem 110 is taken from the +5V supply pins on the PS/2 ports of the computer. Electrical power signals enter subsystem 110 through input header 560 and are passed to voltage boost circuit 510 and to a local power supply 515. Local power supply 515 supplies five volts or another voltage to the circuitry of subsystem 110. Voltage boost circuit 510 boosts the incoming voltage from 5V to a higher voltage in order to overcome and/or compensate for losses, such as IR losses, in electrical cable 130 (FIGS. 1) during the transmission of the electrical power signal across electrical cable 130. As an example, voltage boost circuit 510 can boost the incoming voltage to 30V. The electrical power signal, with boosted voltage, is passed to filter circuit 530, where it will be combined with the coded data signal as described below.

As illustrated in FIG. 5, input header 560 also receives video signals, comprising red, green, and blue video signals, and synchronization signals (sync signals) in addition to receiving data, clock, and electrical power signals. The sync signals are mixed, or multiplexed, into the video signals, and the resulting combined signals (comprising video signals and sync signals) are amplified by a video amplifier 550, passed into end 131 of electrical cable 130 (FIG. 1) and transmitted differentially along electrical cable 130. In one embodiment, the sync signals are mixed into the red and blue video signals only, amplified, and differentially transmitted. In the same or another embodiment, connector 131 is an RJ45 connector. Pre-emphasis circuit 551, in at least one embodiment, forms a part of video amplifier 550. Pre-emphasis circuit 551 pre-emphasizes, or increases, the high-frequency portion of the video signals before the video signals are transmitted across electrical cable 130 because higher frequency video signals are attenuated during such transmission to a greater extent than are lower frequency signals. Pre-emphasizing the high-frequency portion of the video signals in this way makes it easier to recover those signals after they have arrived at subsystem 120 (FIG. 1).

After passing through microprocessor 565 and UART 567, the data signal is passed to modulation/demodulation circuit 520 where it is modulated. The data signal is then coupled onto the boosted voltage at filter circuit 530. The combined signal, comprising: (1) the power signal with the boosted electrical voltage signal; and (2) the data signal, is then sent to filter circuit 530 and then to end 131 of electrical cable 130 (FIG. 1) before being sent across electrical cable 130. Filter circuit 530 prevents the data signal from interfering with power supply 515, as will be discussed in more detail below.

Figure 6:
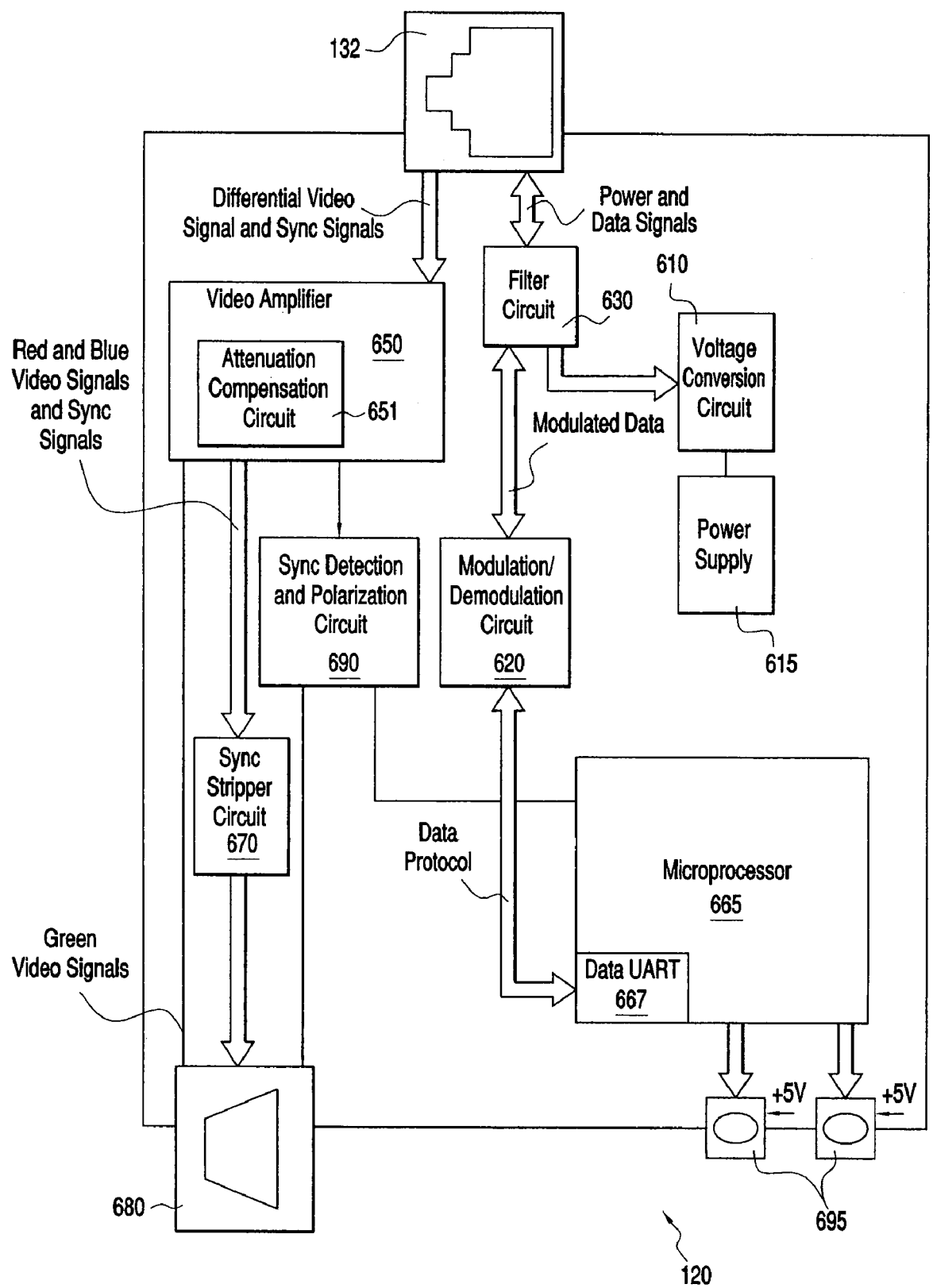
FIG. 6 is a block diagram of a different subsystem of the distance extenders of FIGS. 1 and 2, according to an embodiment of the invention.

FIG. 6 is a block diagram of subsystem 120 of distance extender 100 (FIG. 1), according to an embodiment of the invention. As stated above, in at least one embodiment, subsystem 220 of distance extender 200, both of which were first shown in FIG. 2, and subsystem 420 of distance extender 400, both of which were first shown in FIG. 4, can be the same or substantially similar to subsystem 120.

As illustrated in FIG. 6, subsystem 120 comprises a voltage conversion circuit 610, a modulation/demodulation circuit 620, a filter circuit 630, and an attenuation compensation circuit 651. A power supply 615 supplies power for the circuitry of subsystem 120. As an example, modulation/demodulation circuit 620 can be similar to modulation/demodulation circuit 520 (FIG. 5), and filter circuit 630 can be similar to filter circuit 530 (FIG. 5). Circuit 651 will be described in more detail below. Circuits 620 and 630 will not be separately described because of their similarity to circuits 520 and 530, respectively.

As further illustrated in FIG. 6, multiplexed differential video and sync signals are received through end 132, which can be an RJ45 connector, of electrical cable 130 (FIGS. 1-4) and passed to a video amplifier 650. In one embodiment, differential-to-single-ended amplifiers within video amplifier 650 receive the multiplexed differential video and sync signals. In an embodiment where the sync signals are mixed into the red and blue video signals, the red and blue video signals are routed to a sync stripper circuit 670 and a sync detection and polarization circuit 690 before being sent to a connector 680. Sync detection and polarization circuit 690 recovers the sync polarity from the original video signals, and the polarity-corrected sync signals are sent to connector 680. As an example, connector 680 can be an HDDB15 connector. Referring still to the embodiment where the sync signals are mixed onto the red and blue video signals, the green video is routed directly from the differential-to-single-ended amplifiers to connector 680.

Subsystem 120 also receives the combined signal through end 132 and passes the combined signal through filter circuit 630 to voltage conversion circuit 610 and modulation/demodulation circuit 620. Filter circuit 630 prevents the modulated data signal from interfering with the circuitry of power supply 615. Voltage conversion circuit 610 converts the boosted voltage to a lower voltage, which in at least one embodiment can be 5V, which lower voltage is passed to power supply 615 and used to power the circuitry of subsystem 120.

Modulation/demodulation circuit 620 demodulates the data signal. The demodulated data signal is then sent to a UART 667 on microprocessor 665 where the demodulated data signal is separated into keyboard and mouse data signals and sent to the appropriate one of ports 695. As an example, ports 695 can be PS/2 ports, one of which can receive a keyboard and the other of which can receive a mouse.

Figure 7:
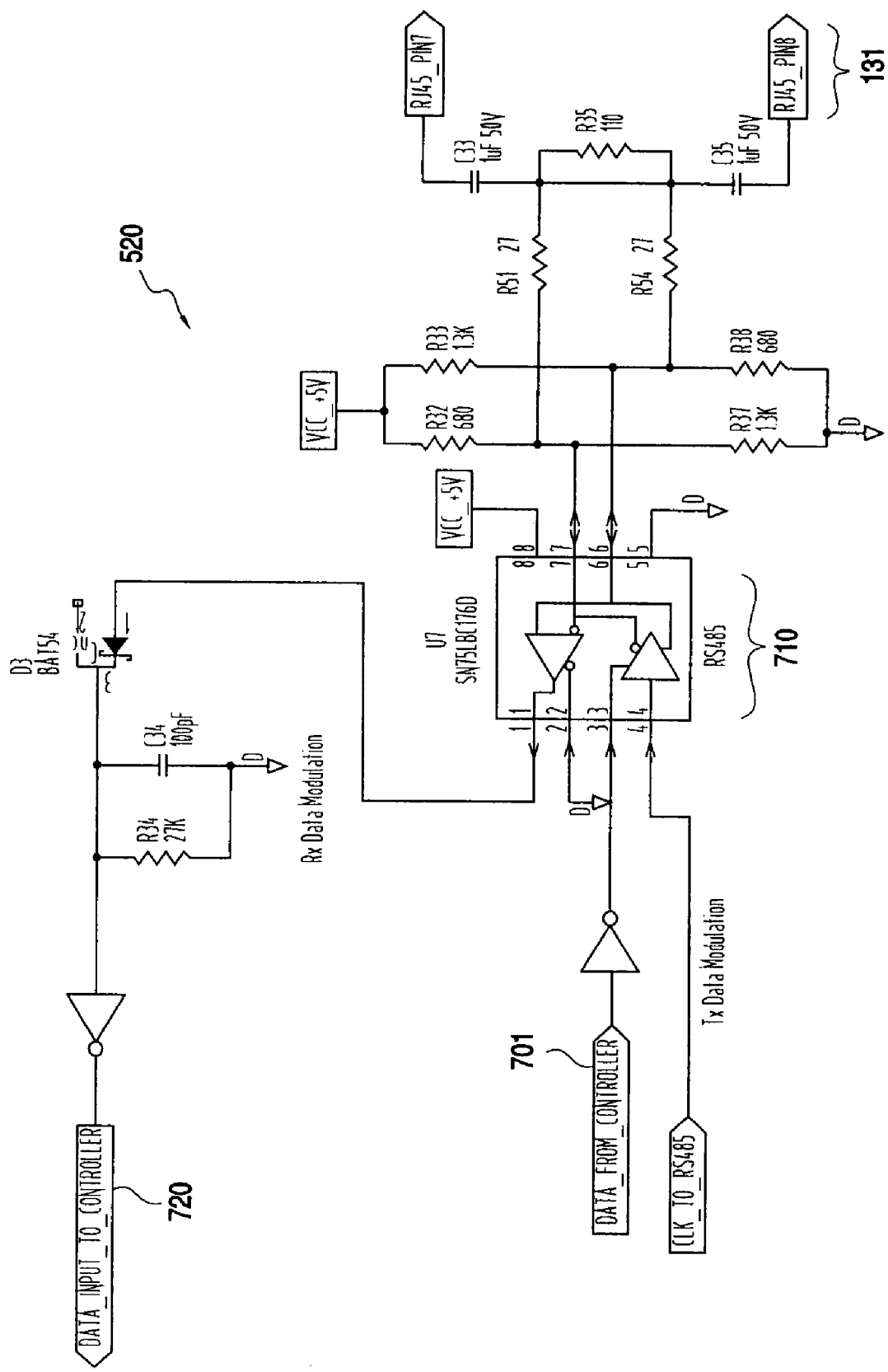
FIG. 7 is a circuit diagram of a modulation/demodulation circuit according to an embodiment of the invention.
Figure 8:
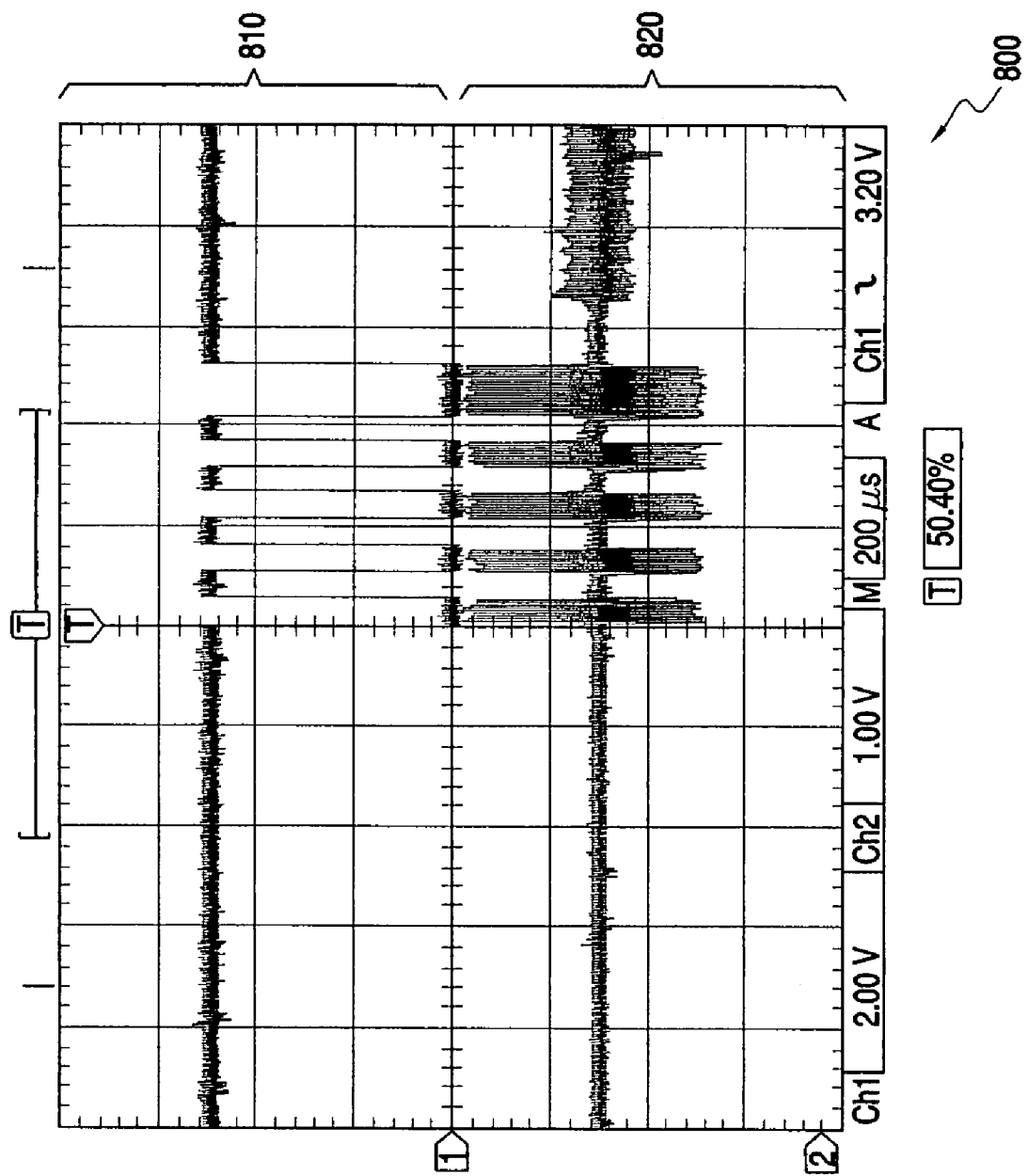
FIG. 8 is a graph of an amplitude-modulated signal of the type produced by the modulation/demodulation circuit of FIG. 7 according to an embodiment of the invention.
Figure 9:
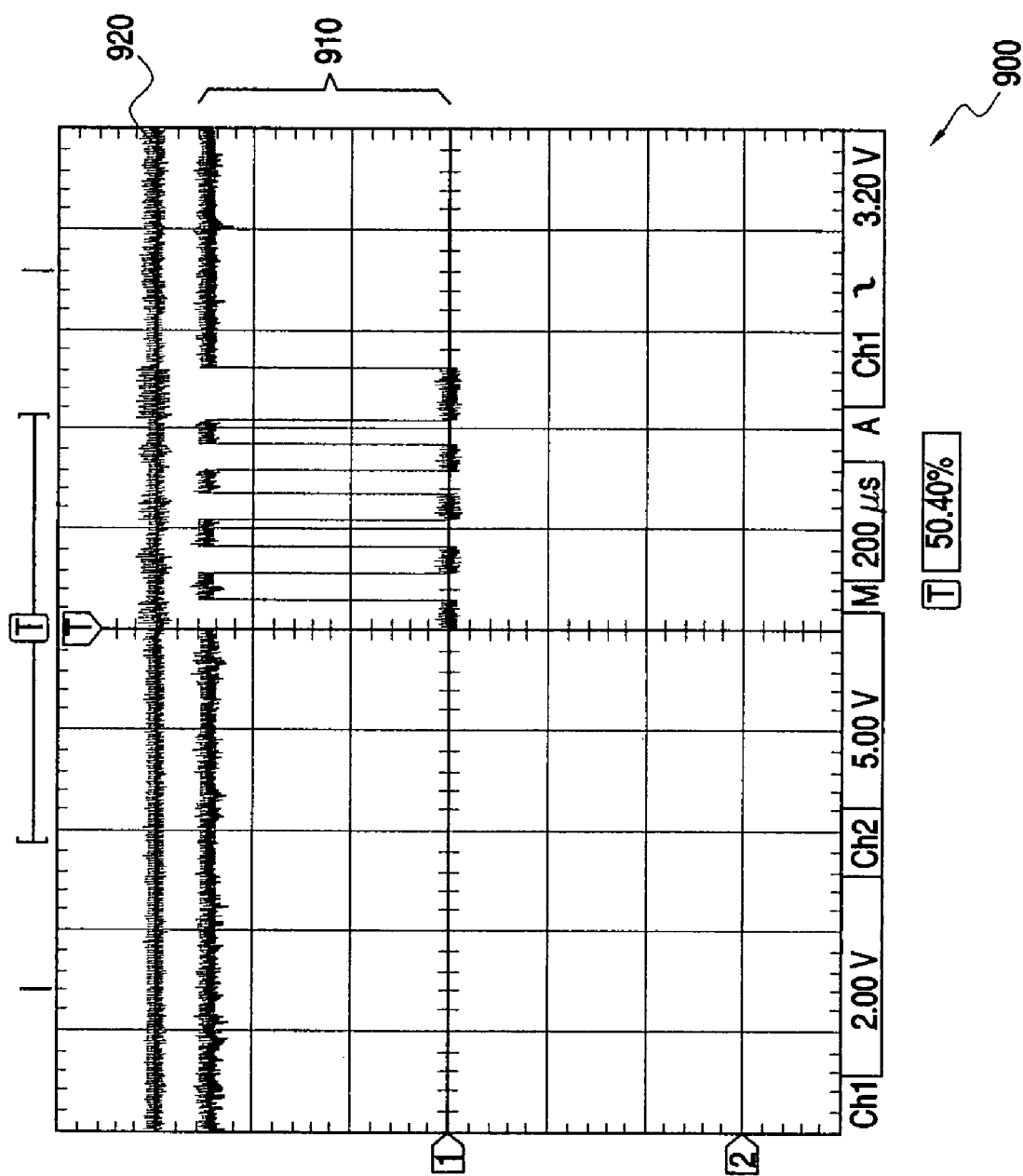
FIG. 9 is a graph of an amplitude-modulated signal of the type shown in FIG. 8 riding on a boosted electrical voltage signal according to an embodiment of the invention.
Figure 10:
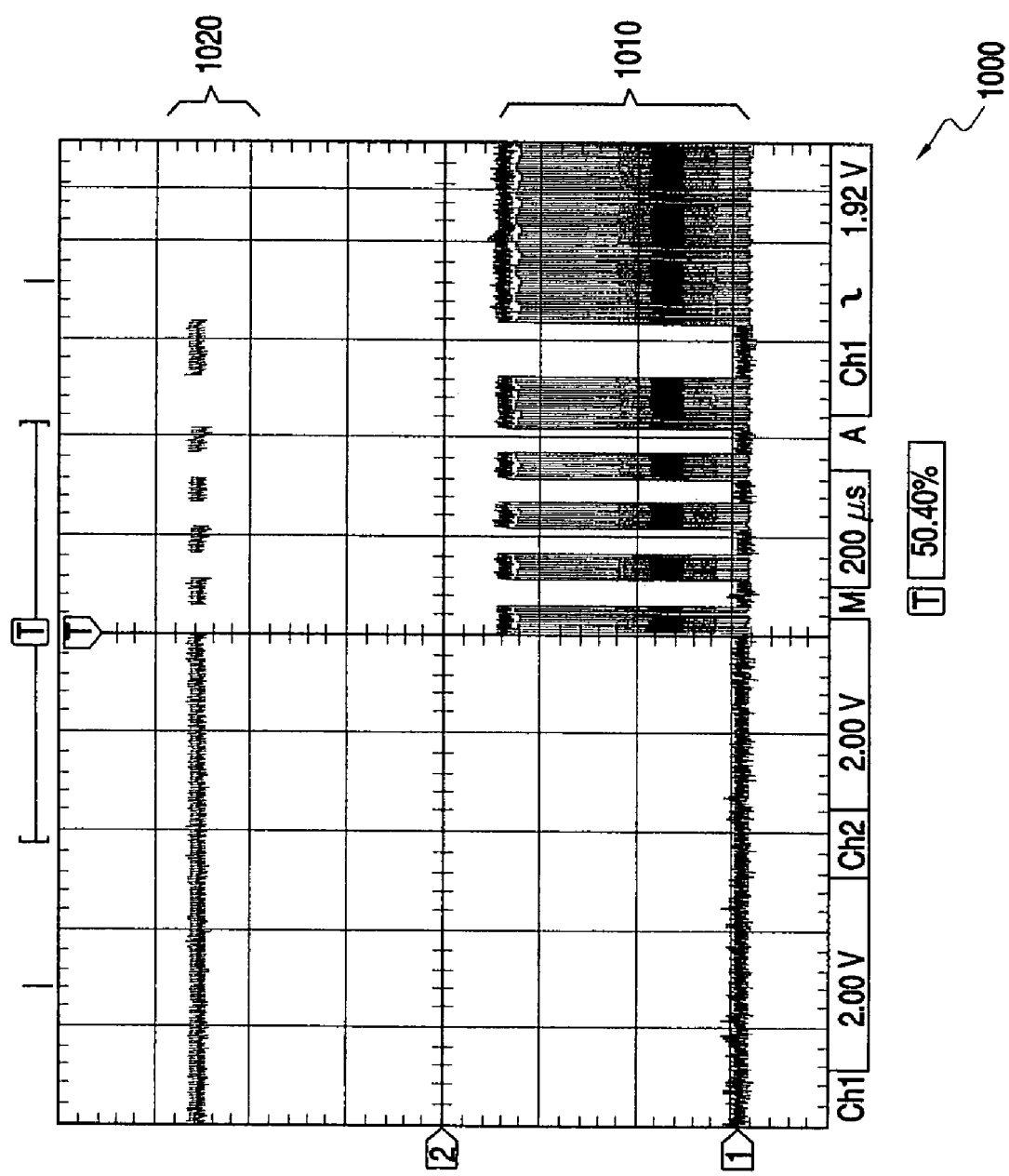
FIG. 10 is a graph showing a recovered signal after being modulated and demodulated according to an embodiment of the invention.

FIG. 7 is a circuit diagram of modulation/demodulation circuit 520 according to an embodiment of the invention. FIG. 8 is a graph 800 of an amplitude-modulated signal of the type produced by modulation/demodulation circuit 520 according to an embodiment of the invention. FIG. 9 is a graph 900 of an amplitude-modulated signal of the type shown in FIG. 8 riding on a boosted electrical voltage signal according to an embodiment of the invention. FIG. 10 is a graph 1000 showing a recovered signal after being modulated and demodulated according to an embodiment of the invention.

As discussed earlier in connection with FIG. 5, the data signal is routed from input header 560 to microprocessor 565, where the data signal is multiplexed and coded prior to being sent to modulation/demodulation circuit 520. The coded data signal is then transmitted by data UART 567 to modulation/demodulation circuit 520. As illustrated in FIG. 7, the data signal enters modulation/demodulation circuit 520 on a line 701, and is labeled "data_from_controller." The data line is a single-ended square wave 0 to 5V signal. A logic "1" is indicated by a 5 volt direct current (DC) level and a logic "0" is indicated by a 0 volt DC level. This signal is inverted and applied to pin 3 of a transceiver 710, which in the illustrated embodiment is an RS485 transceiver. Pin 3 of transceiver 710 is an enable pin. A one megahertz (MHz) signal is applied to the data input of transceiver 710. Whenever pin 3 of transceiver 710 is high the one MHz signal is passed through transceiver 710 to the differential outputs present on pin 6 and pin 7 of transceiver 710. The resultant waveform on pin 6 of transceiver 710 is an amplitude-modulated signal of the type shown in FIG. 8. Since the output of transceiver 710 is a differential signal, the same signal is present on pin 7 of transceiver 710, except that the signal on pin 7 of transceiver 710 is 180 degrees out of phase with the signal on pin 6 of transceiver 710.

A 110 ohm resistor, R35, loads the differential signals present at pins 6 and 7 of transceiver 710. Resistors R32, R33, R37, and R38 bias pins 6 and 7 of transceiver 710 so that the steady state level of pin 1 of transceiver 710 is a logical "0." The signals present at pins 6 and 7 of transceiver 710 are AC coupled through capacitors C33 and C35 to connector pins 7 and 8 of end 131, which is illustrated as an RJ45 connector in FIG. 7. Resistors R51 and R54 and capacitors C33 and C35 are used to match the differential signal to the impedance of electrical cable 130 (FIGS. 1-4) and to the receiver input impedance.

As illustrated in FIG. 8, graph 800 comprises a channel 810 and a channel 820. Channel 810 represents data input on line 701 (FIG. 7) of modulation/demodulation circuit 520 (FIGS. 5 and 7). Channel 820 represents an amplitude-modulated signal such as may be present on pin 6 or pin 7 of transceiver 710.

FIG. 9, in graph 900, illustrates a modulated data signal of the type produced by modulation/demodulation circuit 520 riding on an electrical power signal having a boosted voltage produced by voltage boost circuit 510 (FIG. 5). Graph 900 comprises a channel 910 and a channel 920. Channel 910 represents data input on line 701 (FIG. 7) of modulation/demodulation circuit 520 (FIGS. 5 and 7). Channel 920 represents modulated data riding on an electrical power signal having a boosted voltage of 30 volts. As described above, the modulated data signal and the boosted electrical voltage signal are simultaneously carried on a single wire pair in electrical cable 130 (FIG. 1). As an example, pins 7 and 8 of end 131, shown in FIG. 7, correspond to the two wires of the single wire pair on which the combined signal is carried. In a CAT 5 cable, the two wires form a twisted wire pair, as mentioned above.

To demodulate the data signal, the modulated differential signal is received at pins 6 and 7 of transceiver 710. Transceiver 710 converts this signal to a single-ended output on pin 1 of transceiver 710. An example of the type of single-ended output that may be on pin 1 of transceiver 710 is illustrated in a graph 1000 of FIG. 10. Referring still to FIG. 7, the single-ended output is demodulated using a diode D3, a capacitor C34, and a resistor R34. The signal is inverted and then input to data UART 567 of microprocessor 565.

Referring again to FIG. 10, graph 1000 comprises a channel 1010 and a channel 1020. Channel 1010 represents a modulated data signal such as may be received on pin 1 of transceiver 710. Channel 1020 represents a recovered signal present at an output of a buffer 720, which buffer is labeled "Data_Input_To_Controller" in FIG. 7.

Figure 11:
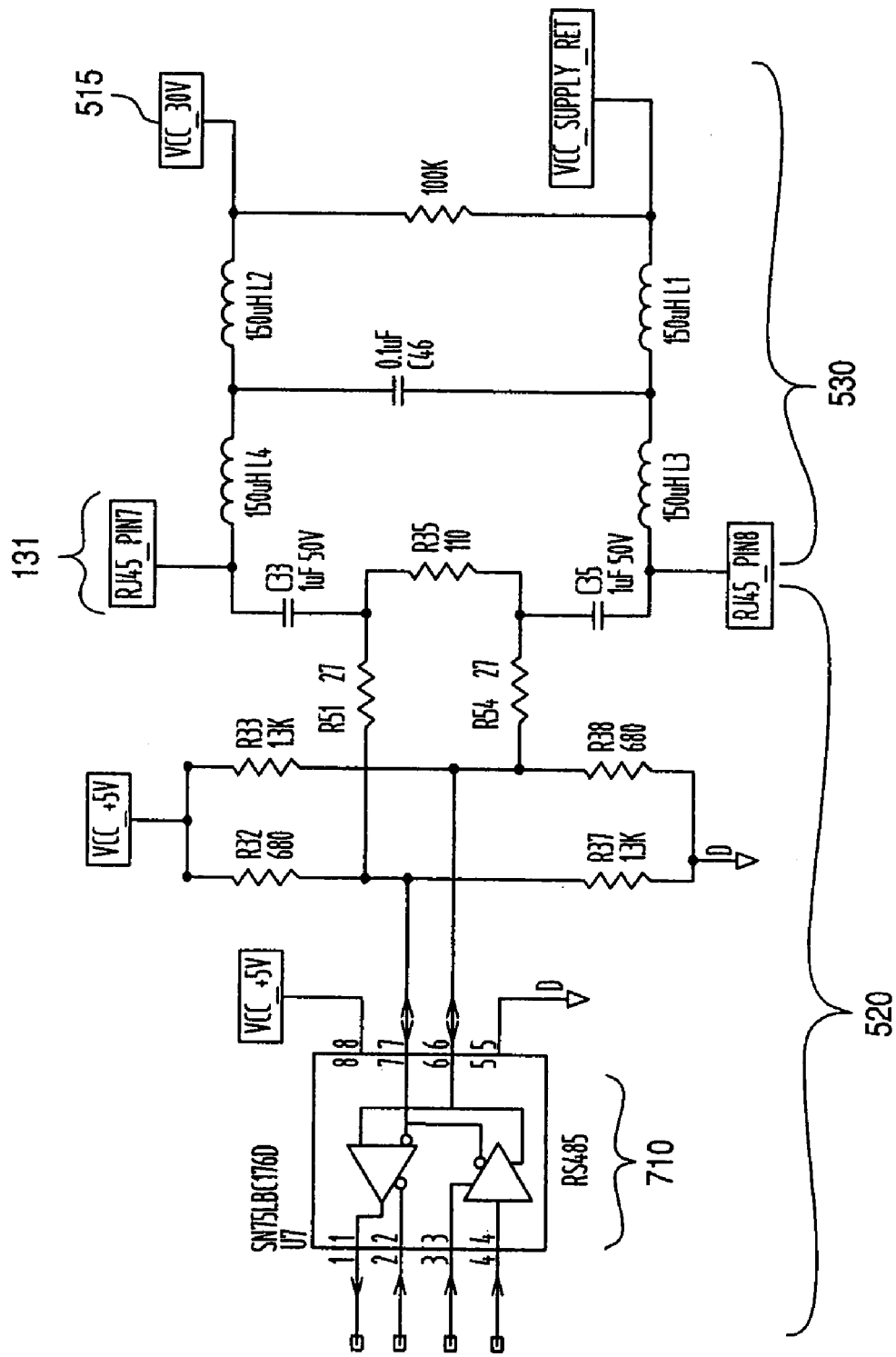
FIG. 11 is a circuit diagram illustrating a portion of the modulation/demodulation circuit of FIG. 7 and a filter circuit according to an embodiment of the invention.

FIG. 11 is a circuit diagram illustrating a portion of modulation/demodulation circuit 520 and a filter circuit 530 according to an embodiment of the invention. Filter circuit 530 prevents the one MHz signal (first discussed in connection with FIG. 7) from interfering with power supply 515 and the circuitry of subsystem 110. As illustrated in FIG. 11, the data signal is coupled onto the connector pins 7 and 8 of end 131 through capacitors C33 and C35. The data signal is blocked from the power of power supply 515 and from the ground signals by inductors L4, L2, L3, and L1, and by a capacitor C46. In the embodiment illustrated in FIG. 11, the modulated data signal is riding on the boosted voltage power line, and on the ground line, but is prevented from back-feeding into power supply 515 by filter circuit 530. As discussed above, filter circuit 630 (FIG. 6) of subsystem 120 is the same or substantially similar to filter circuit 530. Accordingly, the data signal can be transmitted bi-directionally down a single twisted pair of a CAT5 cable or other electrical cable 130 (FIG. 1) and the DC voltage can be delivered to subsystem 120 on the same twisted pair without interfering with the circuitry of subsystem 110 or subsystem 120.

Figure 12:
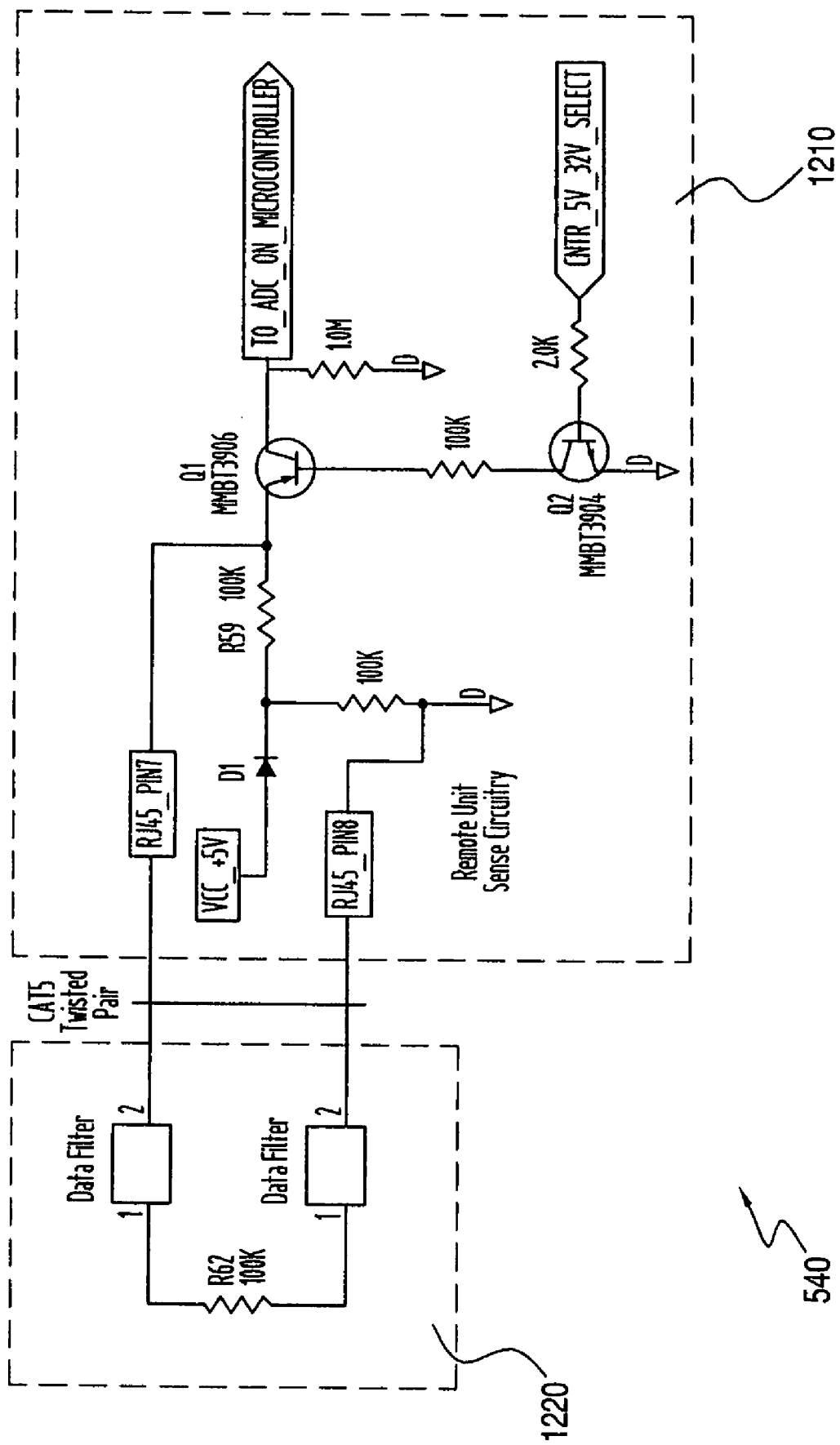
FIG. 12 is a circuit diagram illustrating a detection circuit according to an embodiment of the invention.

FIG. 12 is a circuit diagram illustrating detection circuit 540. A portion 1210 of detection circuit 540 is located on subsystem 110, and a portion 1220 of detection circuit 540 is located on subsystem 120. Subsystem 110 only applies the 5V DC "logic '1'" signal to pin 7 of end 131 until it is determined that subsystem 120 is connected. When it has been determined that subsystem 120 unit is connected, subsystem 110 enables voltage boost circuit 510 which supplies boosted voltage to pin 7 of end 131 (FIG. 1) which in FIG. 12 is illustrated as an RJ45 connector. The detection mechanism of detection circuit 540 comprises a simple circuit to designed to detect that a correct load is attached to the wire pair carrying the combined data and power signal. As illustrated in FIG. 12, 5V DC is applied through a diode D1 and a resistor R59 to pin 7 of the RJ45 connector. With subsystem 120 connected via electrical cable 130 (FIGS. 1-4), resistors R59 and R62 form a voltage divider to ground. With a transistor Q2 turned on by the "CNTR_5V_32V_SELECT" signal, a transistor Q1 passes the voltage at the node of resistors R59 and R62 to the ADC input pin on microprocessor 665 (FIG. 6) of subsystem 120. Microprocessor 665 samples this voltage and, if it is within a predetermined range, transistor Q2 is turned off and the boosted voltage will be applied to pin 7 of the RJ45 connector. On the other hand, if subsystem 120 is not connected to subsystem 110, or if subsystem 110 is connected to a network device, such as a hub, a switch, a router, or the like, the voltage at the node of resistors R59 and R62 will not be in the predetermined acceptable range, and the boosted voltage will not be enabled.

Figure 13:
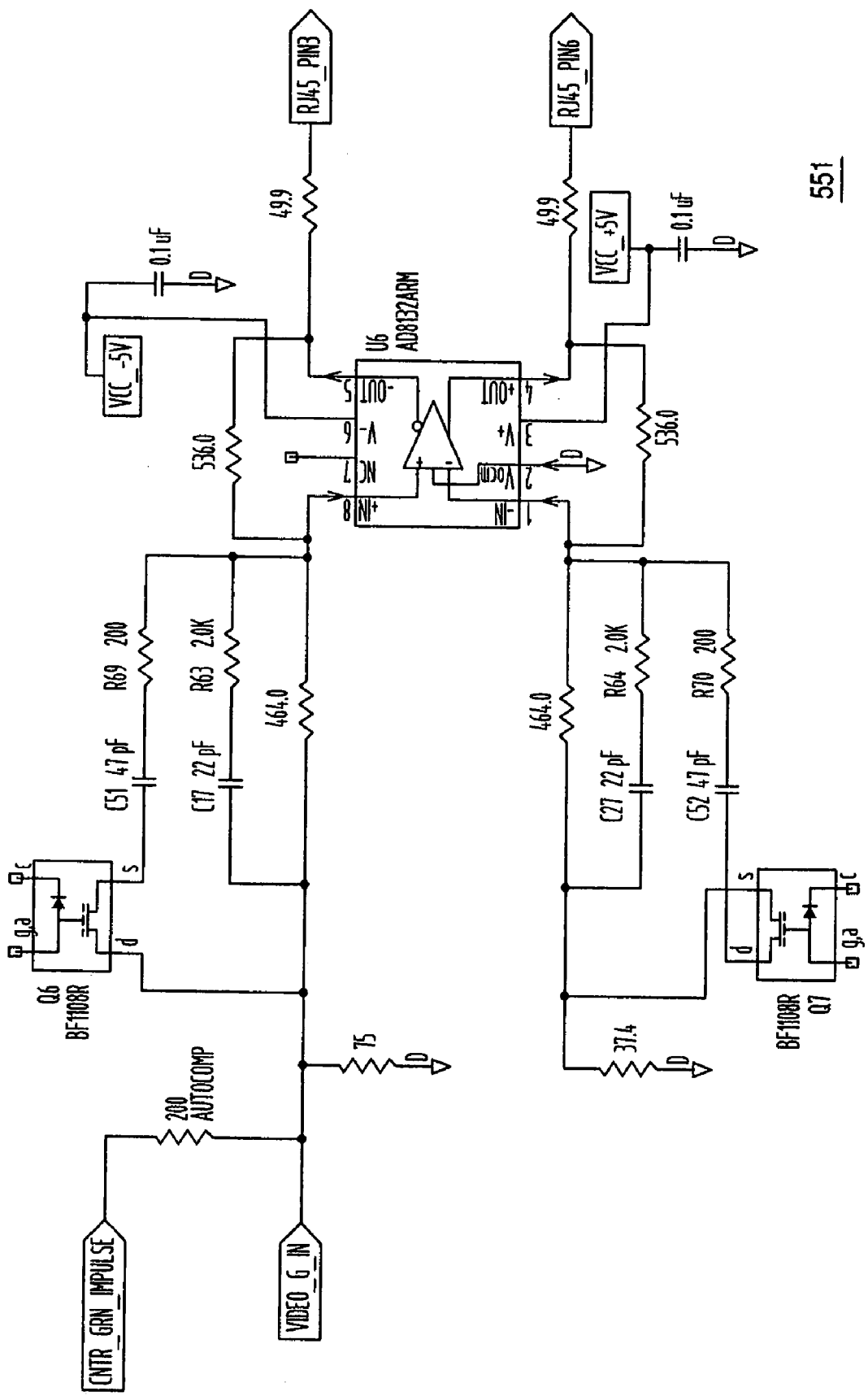
FIG. 13 is a circuit diagram illustrating a pre-emphasis circuit according to an embodiment of the invention.

FIG. 13 is a circuit diagram illustrating pre-emphasis circuit 551, which is designed to emphasize the high frequency component of the video signals, before such signals are transmitted, in anticipation of the high frequency attenuation that occurs over long lengths of electrical cable 130 (FIG. 1). As illustrated in FIG. 13, capacitors C51 and C52 and resistors R69 and R70 are switched into the feedback legs of a differential driver U6 by a transistor Q6 and Q7, respectively. Capacitors C51 and C52 and resistors R69 and R70 give a low impedance feedback path for high frequencies, thus peaking the gain of the high frequency components in the amplifier. A switch on subsystem 120 ultimately controls transistor Q6. The switch is read by microprocessor 665 of subsystem 120, and the status of the switch is transmitted back to subsystem 110 over wire pair carrying the combined data and power signal. Capacitors C17 and C27 and resistors R63 and R64 are also used to adjust the amplifier frequency response.

Figure 14:
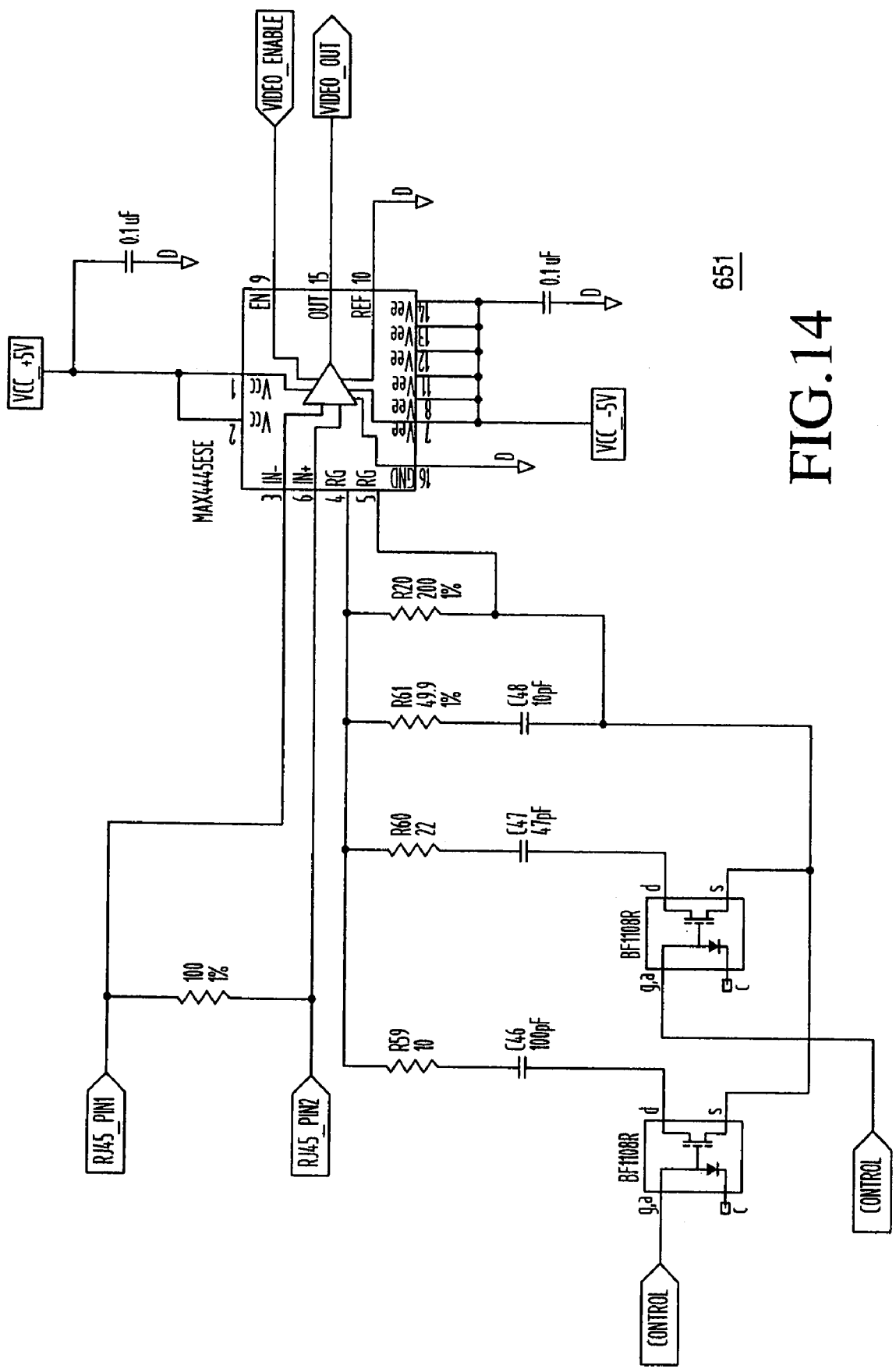
FIG. 14 is a circuit diagram illustrating an attenuation/compensation circuit according to an embodiment of the invention.

FIG. 14 is a circuit diagram illustrating attenuation/compensation circuit 651. As was first discussed above in connection with FIG. 6, subsystem 120 accepts the differential video signals from subsystem 110, amplifies the video signals, and outputs a single-ended video signal to connector 680 (FIG. 6). As the length of electrical cable 130 (FIG. 1) increases, the higher frequency components of the video signals are increasingly more attenuated during their transmission along electrical cable 130, as discussed above. To compensate for the loss of amplitude, a series resistor and capacitor are placed in parallel with a gain resistor R20 of the differential-to-signal-ended amplifier that forms a part of video amplifier 650 (FIG. 6). In this way, various compensation legs can be switched into the feedback path. A resistor R61 and a capacitor C48, a resistor R60 and a capacitor C47, and a resistor R59 and a capacitor C46 respectively form the three resistor-capacitor (RC) pairs.

A microprocessor control signal enables or disables one RC pair at a time depending on a user control switch read by microprocessor 665. These capacitors and resistors give a low impedance feedback path for high frequencies, thus peaking the gain of the high frequency components in the amplifier. The range of frequencies that are peaked and the final gain is dependent on the RC pair that is switched in parallel with gain resistor R20. In this way compensation for attenuation of high frequencies in electrical cable 130 (FIGS. 1-4) is accomplished for varying lengths of electrical cable 130.

FIG. 15 is a flow chart illustrating a method 1500 for increasing a distance between a computer and an operator control center in electrical communication with the computer, where the electrical communication is accomplished via a cable having a first wire pair and a second wire pair. A step 1510 of method 1500 is to provide a first subsystem to be coupled to a first end of the cable. As an example, the cable can be similar to electrical cable 130, the computer can be similar to device 145, and the operator control center can be similar to device 150, all of which were first shown in FIG. 1. As a further example, the first subsystem can be similar to subsystem 110, also first shown in FIG. 1.

A step 1520 of method 1500 is to provide a second subsystem to be coupled to a second end of the cable such that an electrical power signal provided by the computer and a data signal generated by the computer or the operator control center are transmitted simultaneously across the first wire pair between the computer and the operator control center. As an example, the second subsystem can be similar to subsystem 120, first shown in FIG. 1.

A step 1530 of method 1500 is to modulate the data signal to create a modulated data signal. As an example, the modulated data signal can be similar to the signal shown on channel 820 in FIG. 8. As an example, the modulated data signal can be created using modulation/demodulation circuit 520, first shown in FIG. 5, or modulation/demodulation circuit 620, first shown in FIG. 6.

A step 1540 of method 1500 is to modify the electrical power signal to create a boosted electrical voltage signal. As an example, the boosted electrical voltage signal can be created using voltage boost circuit 510.

A step 1550 of method 1500 is to couple the modulated data signal onto the boosted electrical power voltage to create a combined signal. As an example, the combined signal can be similar to the signal shown on channel 920 in FIG. 9.

A step 1560 of method 1500 is to transmit the combined signal across the first wire pair between the computer and the operator control center. In one embodiment, step 1530 or another step can further comprise using the computer to generate a video signal, and step 1560 or another step can further comprise transmitting the video signal across the second wire pair between the computer and the operator control center. In the same or another embodiment, step 1560 or another step further comprises demodulating the modulated data signal after transmitting the modulated data signal across the first wire pair, and/or reducing the boosted electrical voltage signal after transmitting the boosted electrical voltage signal across the first wire pair. In the same or another embodiment, step 1560 or another step further comprises compensating for attenuation of the video signal before transmitting the video signal across the second wire pair and/or compensating for attenuation of the video signal after transmitting the video signal across the second wire pair. In the same or another embodiment, step 1560 or another step further comprises filtering the combined signal to prevent the modulated data signal from interfering with the boosted electrical voltage signal. In the same or another embodiment, step 1560 or another step further comprises detecting the presence of the second subsystem at the first subsystem before enabling the electrical power signal.

In the same or another embodiment of method 1500, step 1510 or another step further comprises providing a switch and electrically coupling the switch between the computer and the operator control center. As an example, the switch can be similar to switch 240, first shown in FIG. 2. In an embodiment where the distance extender comprises a switch, step 1510 or another step further comprises: (1) electrically coupling the switch between the computer and the first subsystem; and (2) electrically coupling the second subsystem between the first subsystem and the operator control center. In another embodiment, step 1510 or another step further comprises: (1) electrically coupling the switch between the second subsystem and the operator control center; and (2) electrically coupling the first subsystem between the computer and the second subsystem. In another embodiment, step 1510 or another step further comprises: (1) providing a third subsystem substantially similar to the first subsystem; (2) providing a fourth subsystem substantially similar to the second subsystem; (3) electrically coupling the third subsystem between the switch and the fourth subsystem; (4) electrically coupling the fourth subsystem between the third subsystem and the operator control center; and (5) electrically coupling the switch between the second subsystem and the third subsystem.

Although the invention has been described with reference to specific embodiments, it will be understood by those skilled in the art that various changes may be made without departing from the spirit or scope of the invention. Various examples of such changes have been given in the foregoing description. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that the distance extender discussed herein may be implemented in a variety of embodiments, and that the foregoing discussion of certain of these embodiments does not necessarily represent a complete description of all possible embodiments.

All elements claimed in any particular claim are essential to the invention claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A keyboard, video, and mouse extender for increasing the distance between a computer and at least one peripheral device, the keyboard, video, and mouse extender comprising:
    a cable comprising:
        a first pair of wires;
        a second pair of wires;
        a third pair of wires; and
        a fourth pair of wires;

a first subsystem capable of being electrically coupled to the first pair of wires and the computer;

a keyboard, video, and mouse switch capable of being electrically coupled between the first subsystem and the computer; and a second subsystem capable of being electrically coupled to the first pair of wires and the at least one peripheral device, wherein:

the computer is configured to provide an electrical power signal;

at least one of the computer and the at least one peripheral device is configured to generate a data signal and at least three video signals;

the first subsystem and the second subsystem are configured such that the first pair of wires concurrently transfer the data signal and the electrical power signal between the first subsystem and the second subsystem; and the first subsystem and the second subsystem are further configured such that the at least three video signals are transferred over the second pair of wires, the third pair of wires, and the fourth pair of wires.

2. The keyboard, video, and mouse extender of claim 1 wherein:

the cable comprises a Category 5-type cable.

3. The keyboard, video, and mouse extender of claim 1 wherein:

the first subsystem is configured to boost the voltage of the electrical power signal and couple the electrical power signal and the data signal after boosting the voltage of the electrical power signal.

4. The keyboard, video, and mouse extender of claim 1 wherein:

the first subsystem, the second subsystem, and one or more of the at least one peripheral device are powered by the electrical power signal.

5. The keyboard, video, and mouse extender of claim 1 wherein:

the second subsystem comprises:
a voltage conversion circuit; and
an attenuation compensation circuit.

6. The keyboard, video, and mouse extender of claim 5 wherein:

the first subsystem comprises:
a voltage boost circuit;
a modulation/demodulation circuit;
a filter circuit,
a detection circuit; and
a pre-emphasis circuit.

7. The keyboard, video, and mouse extender of claim 6 wherein:

the pre-emphasis circuit increases a high-frequency portion of the at least three video signals before the at least three video signals are transmitted across the second pair of wires, the third pair of wires, and the fourth pair of wires; and the attenuation compensation circuit compensates for a loss of amplitude in the t at least three video signals after the at least three video signals are transmitted across the second pair of wires, the third pair of wires, and the fourth pair of wires.

8. The keyboard, video, and mouse extender of claim 3 wherein;

the first subsystem, the second subsystem, and one or more of the at least one peripheral device are powered by the electrical power signal.

9. The keyboard, video, and mouse extender of claim 8 wherein:

the second subsystem comprises:
a voltage conversion circuit; and
an attenuation compensation circuit.

10. The keyboard, video, and mouse extender of claim 9 wherein:

the first subsystem comprises:
a voltage boost circuit;
a modulation/demodulation circuit;
a filter circuit;
a detection circuit; and
a pre-emphasis circuit.

11. The keyboard, video, and mouse extender of claim 10 wherein:

the pre-emphasis circuit increases a high-frequency portion of the at least three video signals before the at least three video signals are transmitted across the second pair of wires, the third pair of wires, and the fourth pair of wires; and the attenuation compensation circuit compensates for a loss of amplitude in the t at least three video signals after the at least three video signals are transmitted across the second pair of wires, the third pair of wires, and the fourth pair of wires.

12. The keyboard, video, and mouse extender of claim 11 wherein:

the cable comprises a Category 5-type cable.

13. The keyboard, video, and mouse extender of claim 1 wherein:

the first subsystem comprises:
a voltage boost circuit;
a modulationldemodulation circuit;
a filter circuit,
a detection circuit; and
a pre-emphasis circuit.

14. The keyboard, video, and mouse extender of claim 13 wherein:

the pre-emphasis circuit increases a high-frequency portion of the at least three video signals before the at least three video signals are transmitted across the second pair of wires, the third pair of wires, and the fourth pair of wires; and the attenuation compensation circuit compensates for a loss of amplitude in the at least three video signals after the at least three video signals are transmitted across the second pair of wires, the third pair of wires, and the fourth pair of wires.

15. The keyboard, video, and mouse extender of claim 14 wherein:

the first subsystem, the second subsystem, and one or more of the at least one peripheral device are powered by the electrical power signal.

16. The keyboard, video, and mouse extender of claim 15 wherein:

the cable comprises a Category 5-type cable.

17. The keyboard, video, and mouse extender of claim 16 wherein:

the first subsystem is configured to boost the voltage of the electrical power signal and couple the electrical power signal and the data signal after boosting the voltage of the electrical power signal.

* * * * *